(12) United States Patent
Carter

(10) Patent No.: US 7,870,916 B2
(45) Date of Patent: Jan. 18, 2011

(54) SYSTEMS AND METHODS FOR POWER STORAGE AND MANAGEMENT FROM INTERMITTENT POWER SOURCES

(75) Inventor: Scott J. Carter, Seal Beach, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 0 days.

(21) Appl. No.: 12/684,687

(22) Filed: Jan. 8, 2010

(65) Prior Publication Data

US 2010/0148582 A1 Jun. 17, 2010

Related U.S. Application Data

(63) Continuation of application No. 11/524,064, filed on Sep. 20, 2006, now Pat. No. 7,658,247.

(51) Int. Cl.
*B60K 6/448* (2007.10)
(52) U.S. Cl. .................... 180/65.24; 180/65.29
(58) Field of Classification Search .......... 180/65.24, 180/65.29, 65.31, 220; 280/33.994, 216, 280/33.992; 310/75, 78, 67 R, 67 A
See application file for complete search history.

(56) References Cited

U.S. PATENT DOCUMENTS

| | | |
|---|---|---|
| 2,964,140 A | 12/1960 | Berezny |
| 3,031,037 A | 4/1962 | Stollman |
| 3,031,038 A | 4/1962 | Chait |
| 3,117,655 A | 1/1964 | Skupas |
| 3,380,546 A | 4/1968 | Rabjohn |
| 3,590,962 A | 7/1971 | Parker |
| 4,037,882 A | 7/1977 | Taylor |
| 4,093,900 A | 6/1978 | Plunkett |
| 4,242,668 A | 12/1980 | Herzog |
| 4,577,880 A | 3/1986 | Bianco |
| 4,591,175 A | 5/1986 | Upton et al. |

(Continued)

FOREIGN PATENT DOCUMENTS

GB 2379804 A 3/2003

(Continued)

OTHER PUBLICATIONS

Press release titled "Gatekeeper Systems announces new product launch," dated Feb. 18, 2005.

(Continued)

*Primary Examiner*—Hau V Phan
(74) *Attorney, Agent, or Firm*—Knobbe, Martens, Olson & Bear, LLP

(57) ABSTRACT

A power management system is disclosed. Embodiments of the power management system may be configured for use with an electric generator that produces AC or DC voltage from an energy source, which may be intermittent or fluctuating. One embodiment of the power management system includes an energy storage reservoir configured to be electrically coupled to the electric generator. The energy storage reservoir includes at least one ultracapacitor and at least one rechargeable battery. The power management system also includes an electronic controller configured to control storage in the reservoir of energy generated by the electric generator and to control power usage from the reservoir and the generator. The electronic controller is configured to control energy storage and power usage in response to one or more control signals.

33 Claims, 16 Drawing Sheets

U.S. PATENT DOCUMENTS

| | | | |
|---|---|---|---|
| 4,629,036 A | 12/1986 | Choy | |
| 4,742,857 A | 5/1988 | Gandhi | |
| 4,772,880 A | 9/1988 | Goldstein et al. | |
| 4,868,544 A | 9/1989 | Havens | |
| 5,000,297 A | 3/1991 | Shaw et al. | |
| 5,053,692 A | 10/1991 | Craddock | |
| 5,072,956 A | 12/1991 | Tannehill et al. | |
| 5,115,159 A * | 5/1992 | Takamiya et al. | 310/67 A |
| 5,194,844 A | 3/1993 | Zelda | |
| 5,315,290 A | 5/1994 | Moreno et al. | |
| 5,357,182 A | 10/1994 | Wolfe et al. | |
| 5,382,854 A | 1/1995 | Kawamoto et al. | |
| 5,394,962 A | 3/1995 | Gray | |
| 5,402,106 A | 3/1995 | DiPaolo et al. | |
| 5,426,561 A | 6/1995 | Yen et al. | |
| 5,432,412 A | 7/1995 | Harris et al. | |
| 5,572,108 A | 11/1996 | Windes | |
| 5,576,691 A | 11/1996 | Coakley et al. | |
| 5,580,093 A | 12/1996 | Conway | |
| 5,598,144 A | 1/1997 | Lace | |
| 5,600,191 A * | 2/1997 | Yang | 310/67 R |
| 5,607,030 A | 3/1997 | Swift et al. | |
| 5,806,862 A | 9/1998 | Merryman et al. | |
| 5,818,134 A * | 10/1998 | Yang et al. | 310/78 |
| 5,821,856 A | 10/1998 | Lace | |
| 5,831,530 A | 11/1998 | Lace et al. | |
| 6,008,546 A | 12/1999 | Sage | |
| 6,037,869 A | 3/2000 | Lace | |
| 6,100,615 A | 8/2000 | Birkestrand | |
| 6,125,972 A | 10/2000 | French et al. | |
| 6,127,927 A | 10/2000 | Durban et al. | |
| 6,161,849 A | 12/2000 | Schweninger | |
| 6,173,817 B1 | 1/2001 | Gray | |
| 6,187,471 B1 | 2/2001 | McDermott et al. | |
| 6,217,398 B1 | 4/2001 | Davis | |
| 6,232,884 B1 | 5/2001 | Gabbard | |
| 6,353,388 B1 | 3/2002 | Durban et al. | |
| 6,355,996 B1 | 3/2002 | Birkestrand | |
| 6,362,728 B1 | 3/2002 | Lace et al. | |
| 6,374,955 B1 | 4/2002 | Gray | |
| 6,398,395 B1 | 6/2002 | Hyun | |
| 6,424,115 B1 | 7/2002 | Holl et al. | |
| 6,481,518 B1 | 11/2002 | Wu | |
| 6,502,669 B1 | 1/2003 | Harris | |
| 6,597,136 B2 | 7/2003 | Burton et al. | |
| 6,739,675 B1 | 5/2004 | Scharpf et al. | |
| 6,744,356 B2 | 6/2004 | Hamilton et al. | |
| 6,774,503 B1 | 8/2004 | Chen | |
| 6,868,318 B1 | 3/2005 | Cawthorne et al. | |
| 6,911,908 B1 | 6/2005 | Beart | |
| 6,928,343 B2 | 8/2005 | Cato | |
| 6,945,366 B2 | 9/2005 | Taba | |
| 6,974,399 B2 | 12/2005 | Lo | |
| 7,061,749 B2 | 6/2006 | Liu et al. | |
| 7,087,029 B2 | 8/2006 | Friedland | |
| 7,087,327 B2 | 8/2006 | Pearson | |
| 7,277,010 B2 | 10/2007 | Joao | |
| 7,392,872 B2 | 7/2008 | Chiu et al. | |
| 7,397,373 B2 | 7/2008 | Hunt | |
| 7,420,301 B2 * | 9/2008 | Veny et al. | 310/75 C |
| 7,658,247 B2 | 2/2010 | Carter | |
| 2001/0008191 A1 | 7/2001 | Smith et al. | |
| 2003/0206102 A1 | 11/2003 | Joao | |
| 2005/0155824 A1 | 7/2005 | Taba | |
| 2005/0279589 A1 | 12/2005 | Gray | |
| 2006/0244588 A1 | 11/2006 | Hannah et al. | |
| 2006/0247847 A1 | 11/2006 | Carter et al. | |
| 2006/0249320 A1 | 11/2006 | Carter et al. | |
| 2007/0045018 A1 | 3/2007 | Carter et al. | |
| 2007/0045019 A1 | 3/2007 | Carter et al. | |
| 2007/0104981 A1 | 5/2007 | Lam et al. | |
| 2007/0225879 A1 | 9/2007 | French et al. | |
| 2008/0066979 A1 | 3/2008 | Carter | |

FOREIGN PATENT DOCUMENTS

| | | |
|---|---|---|
| WO | WO 2004/031017 | 4/2004 |
| WO | WO 2005/118992 | 12/2005 |
| WO | WO 2007/110571 | 10/2007 |
| WO | WO 2007/110572 | 10/2007 |
| WO | WO 2007/110573 | 10/2007 |
| WO | WO 2008/007050 | 1/2008 |

OTHER PUBLICATIONS

2004 Sales presentation of Gatekeeper Systems, Inc. for its Purchek™ push-out prevention system.

Press release dated Apr. 28, 2005, titled "Purchek™—a Trolley-based Anti-theft Solution from Gatekeeper Garners Huge Attention at the 2005 Retail Middle East Exhibition."

International Search Report and Written Opinion for PCT Application No. PCT/US06/36610 mailed on Nov. 21, 2007.

International Preliminary Report on Patentability for Intn'l Appl. No. PCT/US2006/036610, dated Apr. 2, 2009.

* cited by examiner

US 7,870,916 B2

SYSTEMS AND METHODS FOR POWER STORAGE AND MANAGEMENT FROM INTERMITTENT POWER SOURCES

CROSS-REFERENCE TO RELATED APPLICATIONS

This application is a continuation of U.S. patent application Ser. No. 11/524,064, filed Sep. 20, 2006, entitled "SYSTEMS AND METHODS FOR POWER STORAGE AND MANAGEMENT FROM INTERMITTENT POWER SOURCES," which is hereby incorporated by reference herein in its entirety.

BACKGROUND

1. Field

The present disclosure relates to power storage and management systems for electric power from a generator, and more particularly to power storage and management systems for electrical power generated from an intermittent or fluctuating power source.

2. Description of the Related Art

Electrical power can be produced by an electric generator from other sources of energy such as, for example, wind, flowing water, engines, or human or animal power. In some cases, the source of energy is intermittent and/or fluctuating rather than substantially continuous. An electric generator attached to such an energy source will correspondingly produce intermittent and/or fluctuating levels of electric power. For example, an electric generator that converts rotational motion of a vehicle's wheel into electrical power will generate electrical power in proportion to the rotational speed of the wheel, which may vary substantially. In many cases, it is desirable to provide substantially continuous and/or non-fluctuating levels of electric power to electrical loads at times when the energy source is providing little or no power to the generator. The power storage and management systems and methods of the present disclosure address this and other problems.

SUMMARY

An embodiment of a power management system configured for use with an electric generator is disclosed. The power management system comprises an energy storage reservoir configured to be electrically coupled to an electric generator. The energy storage reservoir comprises at least one ultracapacitor and at least one rechargeable battery. The power management system further comprises an electronic controller configured to control storage in the reservoir of energy generated by the electric generator and to control power usage from the reservoir and the generator. The electronic controller is configured to control energy storage and power usage in response to at least one control signal. The electronic controller is further configured to control energy storage in the at least one rechargeable battery based, at least in part, on battery chemistry of the at least one rechargeable battery.

An embodiment of a method for managing power from an electric generator is disclosed. The method comprises generating electric power with an electric generator and storing the electric power as energy in an energy storage reservoir electrically connected to the generator. The energy storage reservoir comprises a bank of one or more ultracapacitors and a bank of one or more rechargeable batteries. The storing is based, at least in part, on battery chemistry in the bank of one or more rechargeable batteries. The method further comprises supplying electric power from the energy storage reservoir to a load when the electric generator is not generating electric power and charging the ultracapacitor bank from the energy stored in the rechargeable battery bank when the generator is not generating electric power.

An embodiment of a power system comprises means for generating electrical power and means for storing the generated electrical power. The storing means is electrically connected to the generating means. The storing means comprises an ultracapacitive storage means and a rechargeable battery storage means. The power system also comprises means for regulating the storage of the generated electric power in the storing means. The regulating means is configured to regulate storage based, at least in part, on battery chemistry of the rechargeable battery storage means. The regulating means further supplies the stored electrical power or the generated electrical power to an electric load.

BRIEF DESCRIPTION OF THE DRAWINGS

These and other features of the invention(s) will now be described with reference to the following drawings illustrating certain preferred embodiments.

Figure 1:
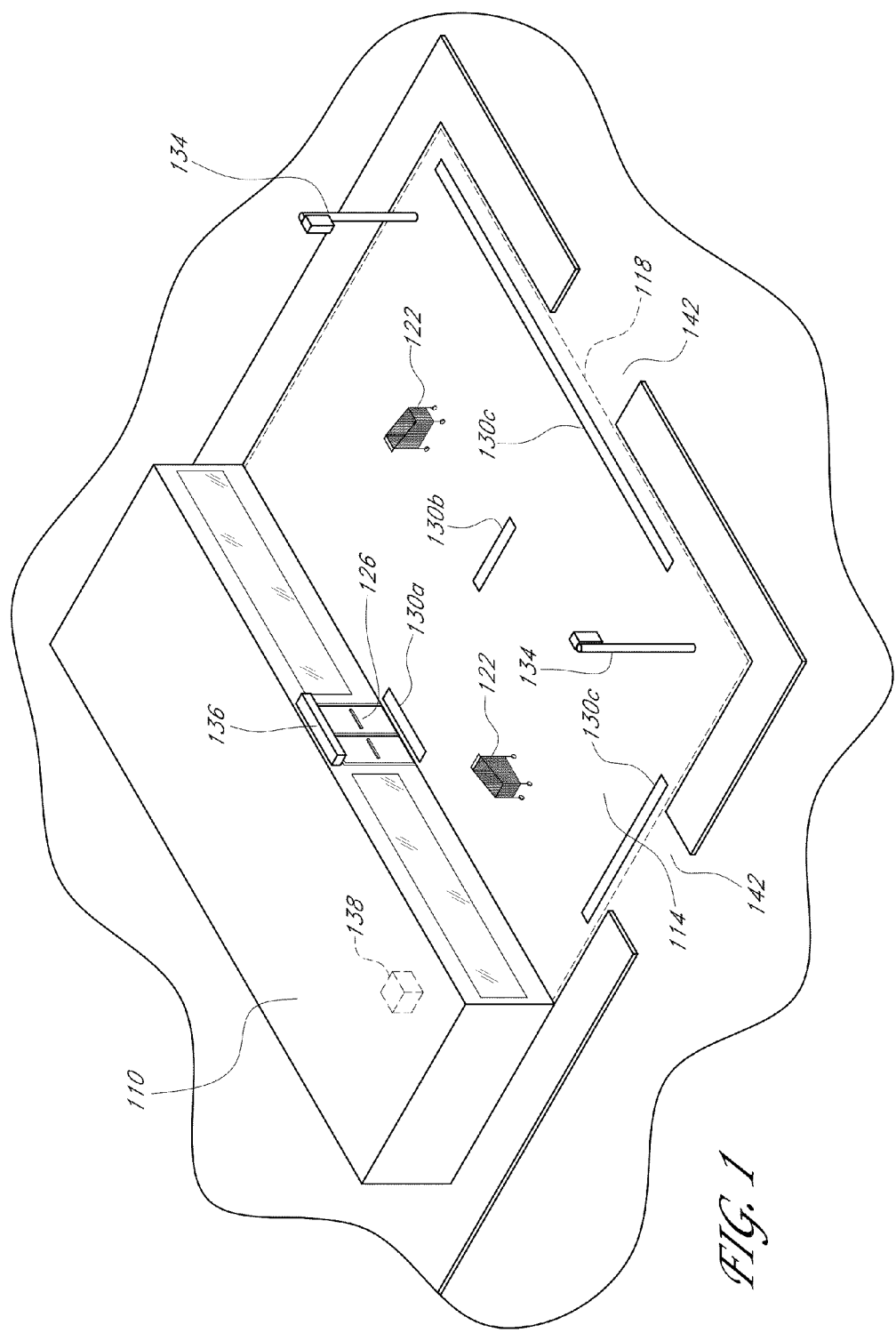
FIG. 1 is a perspective view of a retail store and associated property, illustrating shopping carts that use a wheel power generation system to provide electrical power to other systems disposed on the carts.

Reference symbols are used in the Figures to indicate certain components, features, and aspects shown therein, with reference symbols common to more than one Figure generally indicating like components, features, or aspects.

DETAILED DESCRIPTION OF PREFERRED EMBODIMENTS

I. Overview

Substantially all of the disclosure of U.S. patent application Ser. No. 11/277,029, filed Mar. 20, 2006, entitled "POWER GENERATION SYSTEMS AND METHODS FOR WHEELED OBJECTS," is bodily included in this specification to illustrate how the invention may be implemented and used in the context of a wheeled object such as a non-motorized cart.

Various embodiments of the present invention provide systems and methods for power generation, storage, and management from a source of energy that produces power intermittently and/or at fluctuating levels. In some applications, the energy comes from a source of rotational kinetic energy such as, for example, the rotation of a wheel on a wheeled object. In other applications, the energy may come from a turbine driven by wind or water. Generators can be driven by humans or animals. The energy source may be, for example, an internal combustion engine that is intermittently operated. Many energy sources are contemplated that can be used in a wide range of applications.

An electric generator coupled to such an intermittent or fluctuating energy source produces electric power intermittently and/or at fluctuating levels (which can include very low or even zero levels). For example, a wheel that is not rotating or an internal combustion engine that is not operating will not be a source of usable energy for an electric generator. Additionally, if the wheel is rotating slowly (or the engine is running slowly), the electrical power output by the generator may be very small. Further, if a generator is coupled to a wheeled object that frequently speeds up from rest and then slows down (e.g., a shopping cart pushed throughout a retail store), then the generator will produce electric power levels that are highly variable.

Many electric devices or loads are designed to operate on a substantially continuous source of electric power (averaged over generator cycles). For example, a computer processor or a visual output display may suffer serious performance problems if the electric power level fluctuates. Additionally, a user may desire an electric device to function even when the energy source is not available. For example, a bicycle wheel generator can be used to power a bicycle headlight, however, the bicycle rider may desire the headlight to remain lighted when the bicycle is at rest.

Certain embodiments of the power storage and management systems and methods of the present disclosure may advantageously be used with a generator coupled to intermittent or fluctuating power sources to provide substantially continuous and/or substantially non-fluctuating power levels for a period of time while the source is providing little or no usable energy. Some embodiments of the power storage and management system use a combination of capacitors and batteries to advantageously store and provide usable levels of electrical power for days, months, or years.

For convenience of description only, certain embodiments of the power storage and management systems and methods disclosed herein will be described in terms of an electric generator disposed in a wheel of a vehicle such as a shopping cart. These embodiments are intended to be illustrative of some of the features and advantages of the disclosed systems and methods and are not intended to be limitations on the scope of the invention. Embodiments of the disclosed power systems and methods can be used with any suitable generator coupled to any suitable power source. Certain preferred embodiments of the power systems and methods can be used with an AC or DC generator coupled to, for example, an engine on a lawnmower, a bicycle or motorized-scooter, or a mini-turbine powered by wind or water, or by hand to provide substantially continuous and substantially non-fluctuating electric power to a range of electric loads.

In certain applications, the energy source is rotational energy from a wheeled object, which may have one, two, three, four, or more wheels. The wheeled object includes, but is not limited to, a vehicle, a cart, a carrier, a transport, a gurney, a carriage, a wagon, a stroller, a wheelchair, a hospital bed, a pharmacy cart, a walker, carts used for medical and other equipment, or any other suitable conveyance. A wheeled object may also be a bicycle, moped, or scooter. In some cases, the wheeled object may also have an engine that is a source of intermittent or fluctuating power. In certain preferred embodiments, the wheeled object is a shopping cart, a mobility cart, a warehouse cart, an industrial cart, a luggage cart, or a baggage cart. In some embodiments, the wheeled object is self-propelled, while in other embodiments, the wheeled object requires an outside source, such as a person, to move the object. Accordingly, the various inventive features described herein are applicable to a wide range of different types of wheeled objects and vehicles.

As a wheeled object moves, its wheels rotate. As is well known, a rotating wheel contains mechanical energy in the form of rotational energy. Accordingly, some embodiments of this disclosure provide systems and methods that are configured to convert a portion of the wheel's rotational energy into electrical energy that can be used to power other electrical systems, components, and devices on the object. In addition, certain embodiments beneficially provide systems and methods for electrical power storage and management. Further, certain embodiments provide substantially continuous levels of electrical power for a period of time after the wheeled object has stopped moving. For example, certain such embodiments can supply modest electrical power (e.g., of order milliwatts) for a substantial time period and can also supply high electrical power (e.g., of order tens to hundreds of watts) for a shorter time period.

As used herein, the term "generator" is a broad term, and is used in its ordinary sense, and includes without limitation, unless explicitly stated, an apparatus that converts mechanical energy into electrical or electromagnetic energy. A generator includes, but is not limited to, a dynamo or an alternator. A generator may produce a direct current (DC) and/or an alternating current (AC). Mechanical energy includes, but is not limited to, kinetic energy, and in some embodiments, rotational kinetic energy. In certain preferred embodiments, a generator produces electrical power from a portion of the mechanical energy of one or more rotating wheels.

As is well known, generators typically produce electricity through relative motion between one or more magnets and one or more coils comprising wire windings. According to Faraday's law, the relative motion between a magnet and a coil induces electricity (e.g., voltage and/or current). For example, embodiments of generators often comprise a rotating portion (a rotor) and a stationary portion (a stator). The rotor is configured so that a source of mechanical energy causes the rotor to move (e.g., rotate) relative to the stator. The motion of one or more magnets disposed on the rotor induces electrical power in the windings disposed on the stator. In other embodiments, the magnets are disposed on the stator, and the coils are disposed on the rotor. The generator may be configured so that the rotor turns within the stator, or the stator may be disposed within the rotor. The magnets can be permanent magnets and/or electromagnets. Many generator variations are possible, as is well known in the electrical arts.

In embodiments adapted for use in wheeled objects, one or more generators are disposed in or on the object and mechanically coupled to one or more wheels so that electrical power is generated when the wheels turn. In certain preferred embodiments, the generator is sized and shaped so that portions of it can fit within the wheel as further described herein. Many types of commercially available generators can be used with the systems and methods disclosed herein.

The generator can be configured to provide an AC current and/or a DC current, in various embodiments. For example, some embodiments of the power storage and management system include one or more rectification circuits to convert an AC current into a DC current usable by other systems. In other embodiments, the generator is configured to produce a DC current by using, for example, a commutator, brushes, and/or slip rings. In this case, embodiments of the power storage and management system may not use rectification circuits.

In certain embodiments, the generator is electrically coupled to an electrical energy storage device, which stores the electrical energy for use when the generator is not producing electricity. The electrical storage device can comprise one or more capacitors, rechargeable batteries, or other suitable devices for storing electrical energy. In some embodiments, the electrical storage device comprises one or more capacitors having a high capacitance, a high energy density, and/or a high power density. Such high-capacity capacitors are commonly known as "ultracapacitors" (or supercapacitors) and can store relatively large amounts of electrical energy. As used herein, the term "ultracapacitor" is a broad term, and is used in its ordinary sense, and includes without limitation, unless explicitly stated, any capacitor having a high capacitance, high energy density, and/or high power density. Ultracapacitors include capacitors having capacitances greater than about 0.1 F, and in particular, greater than about 1 F. Ultracapacitors include capacitors having an energy density above about 0.1 Watt-hour/kg, and/or power densities above about 5 Watts/kg. An ultracapacitor includes, for example, a supercapacitor, an electric double layer capacitor (EDLC), and an aerogel capacitor. Certain ultracapacitors have a maximum long-term working voltage of about 2.5 V (at room temperature), a conductance of about 2 Siemens per Farad and an equivalent series resistance (ESR) reciprocal to the conductance, a self-discharge time of several days or longer, and may be operated for several hundred thousand discharge cycles without significant degradation. Ultracapacitors also include other types of capacitors having lower capacitance but higher working voltage so as to provide an energy storage capacity of at least about 0.1 Joules.

Other systems disposed in or on the object can be configured to use the electrical energy generated by the generator and stored in the electrical storage device during times when the object's wheels are not rotating (e.g., when the generator is not providing power). In some embodiments, these systems are disposed substantially within the wheel, and/or they may be distributed throughout the object. Electrical power can be provided by disposing wired connections between these systems and the generator and/or the electrical storage device. In some embodiments, the electrical storage device comprises a backup power system such as, for example, a backup battery system (which may comprise disposable and/or rechargeable batteries), from which power can be drawn if the ultracapacitors discharge.

Embodiments of the power system additionally comprise control circuitry that provides rapid and efficient charging of the energy storage device, reduces the discharge rate of the storage device, and provides one or more voltages suitable for operating other systems, among other functions.

In some preferred embodiments, the power system is disposed within a wheel of the object. However, in other embodiments, portions of the power system are disposed elsewhere in the object, for example, in a wheel assembly attaching the wheel to the object (e.g., a fork or a caster), or in a portion of the object's frame or handlebars, or in other suitable locations. The power system can be configured to supply power to systems disposed in a wheel (including, but not limited to, the wheel comprising the generator) or to systems disposed elsewhere in the object (e.g., a display mounted to the handlebars) or even off the object. It is recognized that that the power system can be configured in a wide variety of ways and electrically coupled to many types of systems.

It is not a requirement of the present invention that the power system be used with wheeled objects. For example, the power system can be used with an AC or DC generator attached to an engine or turbine. Embodiments of the power system can be used in many applications. Although certain example embodiments and example operating scenarios are described below in which the power system is coupled to a power generator in a wheel, these example embodiments and scenarios are not intended to limit the scope of the invention.

II. Example Operating Scenario

The power system disclosed herein can be used in any wheeled device and can be configured to provide power to any type of system or systems on the object. For purposes of illustration, an example scenario will now be discussed that illustrates some of the features and advantages of the power system. This example scenario is intended to facilitate understanding of certain embodiments of the power system and uses of the power system and is not intended to limit the scope of the principles disclosed herein.

In the sample scenario shown in FIG. 1, a retail store 110 implements a loss prevention system to reduce the theft of shopping carts 122 from a tracking area 114. The tracking area 114 may comprise, for example, a portion of a parking lot adjacent to the store 110. An objective of the loss prevention system is to prevent, or at least reduce, the unauthorized transport of carts 122 across a boundary (or perimeter) 118 of the lot 114. In one embodiment of the loss prevention system, each cart 122 may include an anti-theft system comprising, for example, an alarm or a mechanism to inhibit motion of the cart 122.

Cart motion can be inhibited, for example, by providing at least one wheel of the cart 122 with a brake mechanism configured to lock the wheel. Cart motion can be inhibited in other ways, as is known in the art. For example, the wheel braking mechanism described herein can be replaced with another type of electromechanical mechanism for inhibiting the motion of the cart, including mechanisms that cause one or more of the wheels of the cart 122 to be lifted off the ground. In some embodiments, the brake mechanism comprises a motor that drives an actuator that can engage an inner surface of the wheel so as to inhibit the motion of the wheel. In certain embodiments, the brake mechanism has an unlocked state in which the wheel can substantially freely rotate and a locked state in which the wheel's rotation is substantially impeded. In other embodiments, the brake mechanism is progressive, wherein the actuator can apply differing amounts of braking force to the wheel. A brake mechanism suitable for use with wheeled devices such as shopping carts is disclosed in U.S. Pat. No. 6,945,362, issued Sep. 20, 2005, titled "ANTI-THEFT VEHICLE SYSTEM," the disclosure of which is hereby incorporated by reference herein in its entirety.

To prevent loss, if the cart 122 is moved across the lot boundary 118, the anti-theft system is activated (e.g., the alarm or the brake is triggered). In some loss prevention systems, the anti-theft system is activated if the cart 122 detects a signal from an external transmitter positioned near the lot boundary 118. For example, the signal may be a VLF signal transmitted from a wire buried at the boundary 118, such as described in U.S. Pat. No. 6,127,927, issued Oct. 3, 2000, titled "ANTI-THEFT VEHICLE SYSTEM," the disclosure of which is hereby incorporated by reference herein in its entirety.

In some embodiments, a navigation system is used to determine the position of the cart 122 within the tracking area 114. The navigation system can be disposed on or in the cart 122 or in a central controller 138. If the navigation system determines the position of the cart 122 to be outside the lot boundary 118, the anti-theft system can be activated. In one embodiment, the navigation system begins to monitor cart position when the cart 122 leaves a store exit 126. The initial cart position is set to be the position of the exit, and the navigation system updates the position of the cart 122 by a dead reckoning algorithm. The dead reckoning algorithm uses object speed, heading, distance traveled, and elapsed time to estimate the position of the cart. Accordingly, in various embodiments, the cart 122 includes heading sensors, motion sensors, and processors. In one embodiment, the object's heading is measured with respect to the Earth's magnetic field, and the cart 122 includes magnetic field sensors to determine, e.g., the object's direction of travel with respect to geomagnetic North. To determine the cart's speed or distance traveled, one or more wheels may include rotation sensors including, for example, mechanical, optical, or magnetic rotary encoders.

In some embodiments, the navigation system is provided with the position of the lot boundary 118, for example, as a set of coordinates. By comparing the present position of the cart 122 with the position of the boundary 118, the system can determine whether the cart 122 is within the lot 114. If the navigation system determines the cart 122 is moving across the lot boundary 118, the navigation system can activate the cart's anti-theft system. In a preferred embodiment, the navigation system is sized so as to fit within a wheel of the cart 122. In other embodiments, portions of the navigation system can be disposed in a wheel, while other portions can be disposed elsewhere in the cart 122 (e.g., in handlebars or the frame). A navigation system suitable for use with a wheeled object, such as a shopping cart, is disclosed in U.S. patent application Ser. No. 11/277,027, filed Mar. 20, 2006, entitled "NAVIGATION SYSTEMS AND METHODS FOR WHEELED OBJECTS," hereinafter the "Navigation Patent Application," the disclosure of which is hereby incorporated by reference herein in its entirety.

In other embodiments, the navigation system communicates the position of the cart 122, or other information, to a central processor or the central controller 138, which determines whether the cart 122 has exited the lot 114 and whether the anti-theft system should be activated. In certain preferred embodiments, the cart 122 includes a two-way communication system that enables suitable information to be communicated between the cart 122 and the central controller 138 (or other suitable transceivers). The communication system may include one or more antennas, transmitters, receivers, transceivers, signal generators, or other components. A two-way communication system suitable for use with the navigation system is disclosed in U.S. patent application Ser. No. 11/277,016, filed Mar. 20, 2006, entitled "TWO-WAY COMMUNICATION SYSTEM FOR TRACKING LOCATIONS AND STATUSES OF WHEELED VEHICLES," hereinafter the "Two-Way Communication Patent Application," the disclosure of which is hereby incorporated by reference herein in its entirety.

Other devices can be advantageously used by the retail store 110 in this sample scenario. For example, one or more markers 130a-130c can be disposed at various locations throughout the lot 114 to serve as reference locations, landmarks, or beacons. The markers 130a-130c can mark or otherwise indicate the position of, for example, store exits 126 (e.g., marker 130a), the perimeter of the lot 114 (e.g., markers 130c), and/or other suitable reference locations (e.g., marker 130b). In various embodiments, the markers 130a-130c communicate information to the navigation system by, for example, magnetic or electromagnetic methods. The navigation system may use information communicated from a marker 130a-130c to reduce accumulated navigational errors, to determine that a lot boundary 118 is nearby, or for other purposes. In some embodiments, one or more markers (e.g., the markers 130c) may be disposed near locations of entrances/exits 142 to the parking lot 114.

In one embodiment, one or more transmitters 134 are disposed throughout the lot 114 and are configured to transmit information to the navigation system in the carts 122. The transmitters 134, in an embodiment, also receive information (e.g., they are transceivers). In various embodiments, the markers 130a-130c (and/or the transmitters 134) communicate with the carts 122 via one-way (to or from the cart) or two-way (to and from the cart) communication protocols. For example, the markers 130 and/or transmitters 134 may be configured to use electromagnetic signals to communicate with the cart 122. These signals may include magnetic signals and/or RF or VLF signals. As used herein, RF signals comprise electromagnetic signals having frequencies below about 300 GHz, and VLF ("very low frequency") signals comprise RF signals having frequencies below about 20 kHz.

In other embodiments, one or more access points (AP) 136 are used to create two-way communication links with the carts 122. In FIG. 1, the access point 136 is shown positioned above the exit 126 of the store 110, which beneficially allows the AP to communicate with carts 122 located throughout the parking lot 114. In other implementations, more than one AP can be used, and the AP's can be located throughout the tracking area. Access points 136 can communicate with a transceiver in the cart 122 (e.g., an RF transceiver), which is connected to the navigation system (and/or other components) for purposes of retrieving, exchanging, and/or generating cart status information, including information indicative or reflective of cart position. The types of cart status information that may be retrieved and monitored include, for example, whether an anti-theft system has been activated (e.g., whether a wheel brake is locked or unlocked); whether the cart 122 is moving and in which direction; the wheel's average speed; whether the cart 122 has detected a particular type of location-dependent signal such as a VLF, EAS, RF, or magnetic signal (discussed below); whether the cart is skidding; the cart's power level; and the number of lock/unlock cycles experienced by the cart per unit time. The access points 136 can also exchange information with the navigation system related to the position of the perimeter 118. In some embodiments, the access points 136 use a received signal strength indicator (RSSI) to measure the strength of the signal received from the cart 122 to assist in determining the distance to the cart 122 and whether the cart is moving toward or away from the store 110. Further details on the implementation and use of a set of wireless access points (AP) is disclosed in the Two-Way Communication Patent Application.

The navigation system may be used by the store 110 for purposes additional to or different from loss prevention. In some embodiments, the retail store 110 may wish to gather information related to the positions and paths taken by the carts 122. For example, the retail store may wish to determine where in the lot 114 that customers leave carts 122 so as to improve cart retrieval operations. In other embodiments, the navigation system can communicate with other devices such as, for example, a mechanized cart retrieval unit.

Although the sample scenario has been described with reference to a loss prevention system for shopping carts 122 in a parking lot 114 outside a retail store 110, in some embodiments, the navigation system is configured to determine the position of a cart 122 within the store 110. For example, the system may be used to determine whether a cart 122 has passed through a checkout lane or whether the cart 122 has passed through selected aisles. In addition, the navigation system may be used to track cart positions so as to gather information related to the clustering or queuing of carts at certain locations inside or outside the store 110. Moreover, other systems may be disposed on the cart 122 including, for example, an input/output device such as a display, monitor, touchscreen, keyboard, or keypad and/or a lighting system (including, e.g., headlights, taillights, turn signals, and/or indicator lights). Further details of a handle-mounted display system that can be electrically powered by the power system disclosed herein are discussed in the Two-Way Communication Patent Application.

Accordingly, the cart 122 can include a wide variety of systems, with each system having its own power needs. For example, a motor in a brake system may require relatively high voltage, current, and power to operate, while a microcontroller system may require lower operating voltage and power. Some systems require a continuous supply of power (e.g., a navigation system, a display, or a light), while other systems use power intermittently (e.g., when a wheel brake is activated). Therefore, it is beneficial to dispose on the cart 122 a power system that can generate and store sufficient power for each of these systems.

In some embodiments, the power generation system is disposed within and provides power to one or more systems also located in the wheel. For example, in one preferred embodiment, the power generation system is disposed within a wheel and is used to power a brake system also disposed in the wheel. However, this is not a requirement, and in other embodiments, the power system is connected, for example, by electrical wires, to systems disposed elsewhere (e.g., in or on the handlebars or frame of a cart). For example, in various embodiments, the wheel power system can be used to power a display attached to the cart's handlebars, one or more lights attached to the frame, a communications system disposed in the cart's frame, and an anti-theft system (including, e.g., an alarm and/or a wheel brake, which may be disposed in a different wheel than the power system). In another preferred embodiment, the power system is used to power one or more transceivers (e.g., RF or VLF transceivers) disposed in the cart and used to communicate with other transmitters 134 or access points 136. Many variations are possible, and a skilled artisan will recognize the versatility of uses for the power system disclosed herein.

Embodiments of the above-mentioned systems may be used in other environments and contexts such as, for example, a warehouse, an industrial plant, an office building, a hospital, an airport, or other facility. Accordingly, the power systems and methods disclosed herein can be used in many different types of facilities and in many types of wheeled objects. Many variations of the sample scenario discussed above are possible without departing from the scope of the principles disclosed herein.

III. Wheel with Power Generation System

Figure 2A:
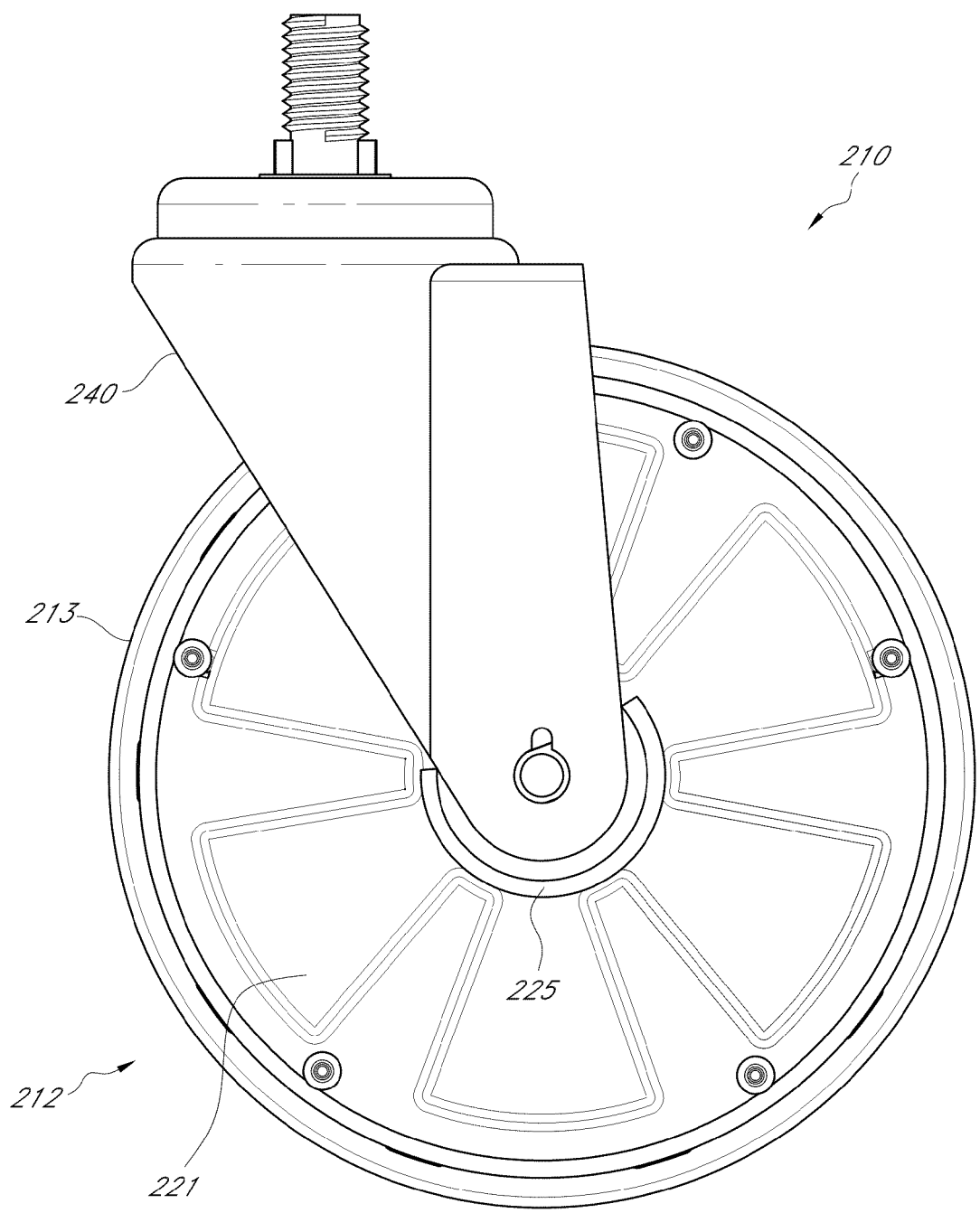
FIG. 2A is a plan-view of an embodiment of a wheel and wheel assembly that can be used on an object such as a cart.

FIG. 2 is a plan-view of an embodiment of a wheel assembly 210 comprising a wheel 212 and a caster 240 (also known as a "fork" or a "yoke"). The wheel assembly 210 is adapted to be attached to an object, such as a cart, by being screwed in to the object. The wheel assembly 210 can be used to replace one (or more) of the wheels on the object. For example, the wheel assembly 210 can replace a standard-sized front (and/or rear) wheel on a shopping cart. In certain embodiments, the wheel 212 has a diameter of about five inches, although the wheel 212 can be larger or smaller in other embodiments. The wheel 212 includes a tire 213 that is circumferentially disposed about a hub 218 (see FIGS. 3A-3C). The hub 218 rotates with the tire 213. The hub 218 can have a cover 221 that protects components disposed within the hub 218 from environmental conditions In addition, the cover 221 prevents internal components from being seen and tampered with by users of the object. The hub 218 (and the cover 221) can be fabricated from rigid, lightweight materials including plastics such as nylon or acrylonitrile butadiene styrene (ABS).

Figure 2B:
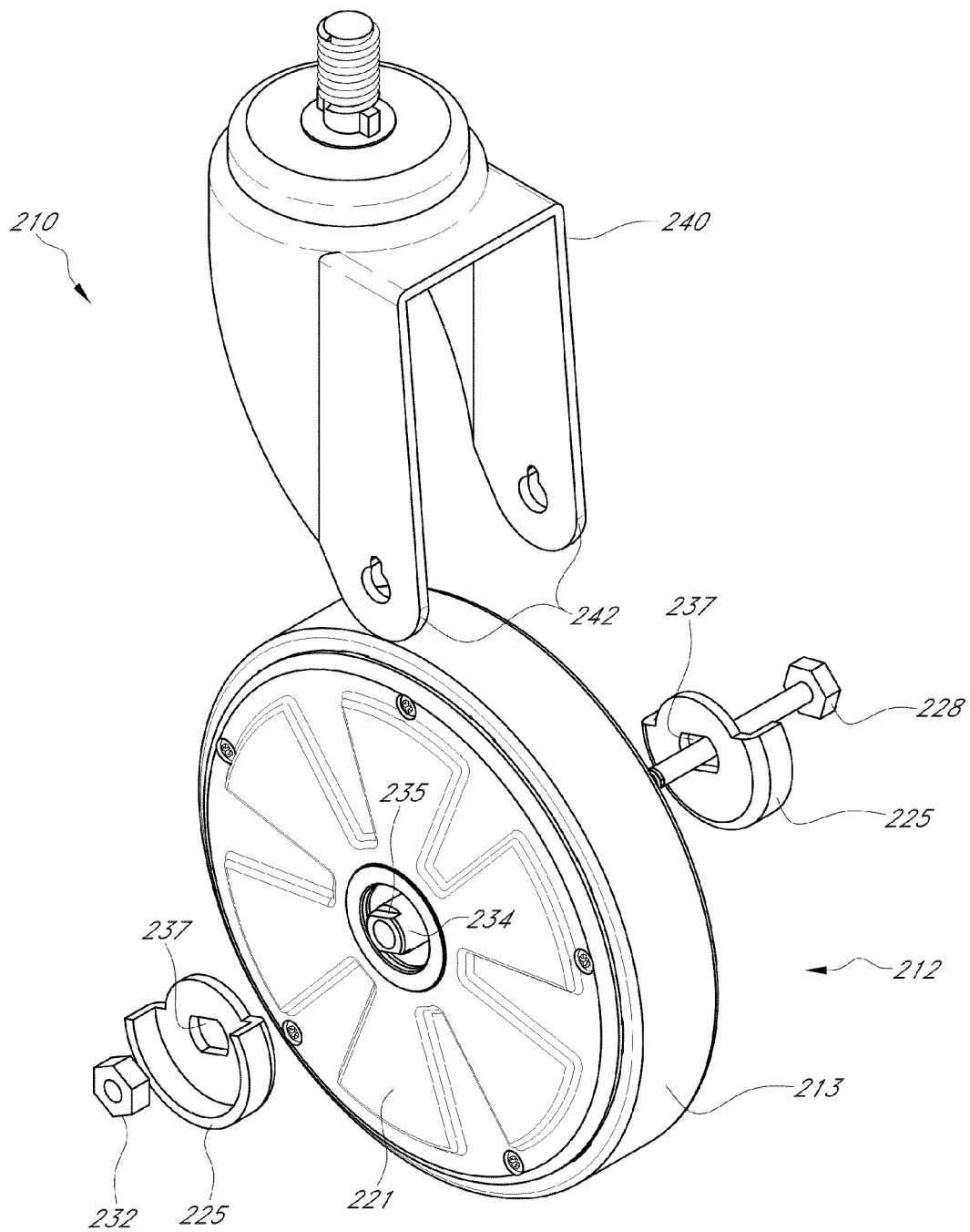
FIG. 2B is an exploded view of the wheel assembly shown in FIG. 2A.

FIG. 2B is an exploded view of the wheel assembly 210. The wheel 212 is disposed between end portions 242 of the caster 240. The end portions 242 fit into "U"-shaped retaining clips 225. A bolt 228 passes through the retaining clips 225, the end portions 242, and a hollow axle 234 in the center of the hub 218. A nut 232 is tightened to secure the wheel 212 to the caster 240. The axle 234 has flat portions 235 that engage shaped holes 237 in the retaining clips 225. The axle 234 is prevented from rotating by the interference fit between the "U"-shaped sides of the retaining clips 225 and the end portions 242 of the caster 240. Internal components disposed within the hub 218 can be prevented from rotating by attaching them to the non-rotating axle 234. The wheel 212 can be configured to contain some or all portions of other suitable systems including, for example, a power system, a navigation system, an anti-theft system, a brake system, and/or a two-way communication system.

Figure 3A:
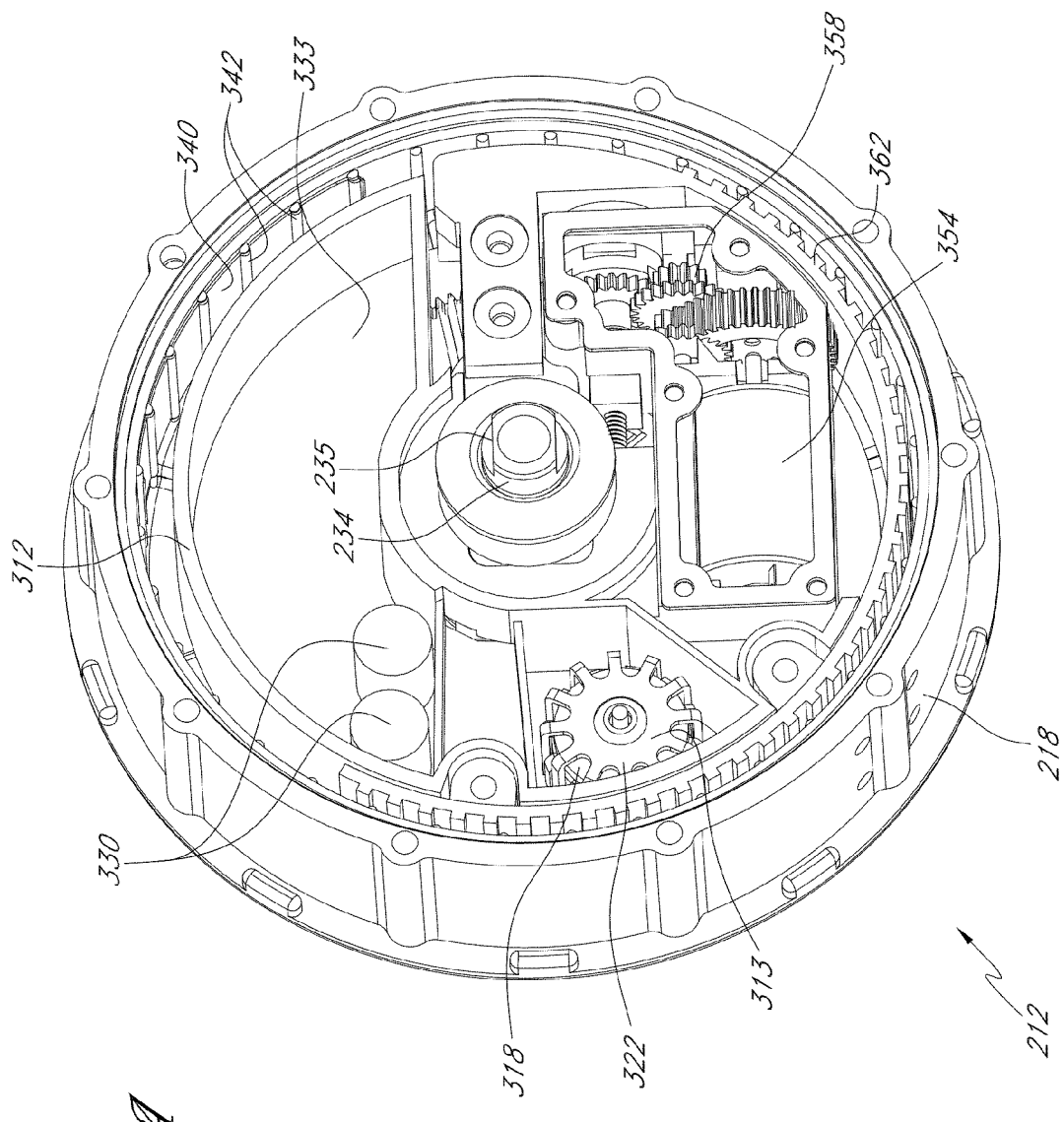
FIG. 3A is a perspective front view of the hub of the wheel with the cover and control circuitry removed.
Figure 3B:
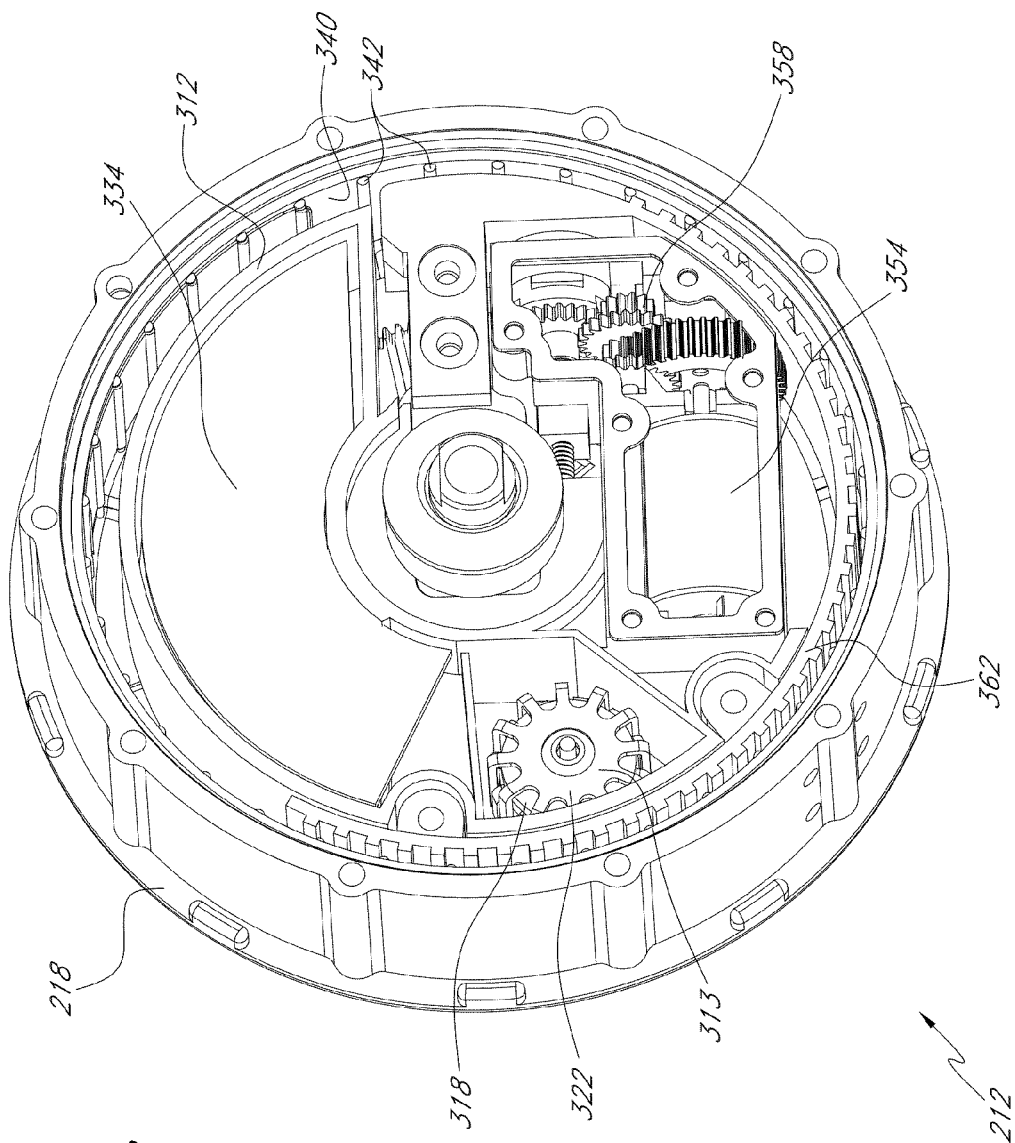
FIG. 3B is a perspective front view of the hub of the wheel shown in FIG. 3A with the control circuitry in place.
Figure 3C:
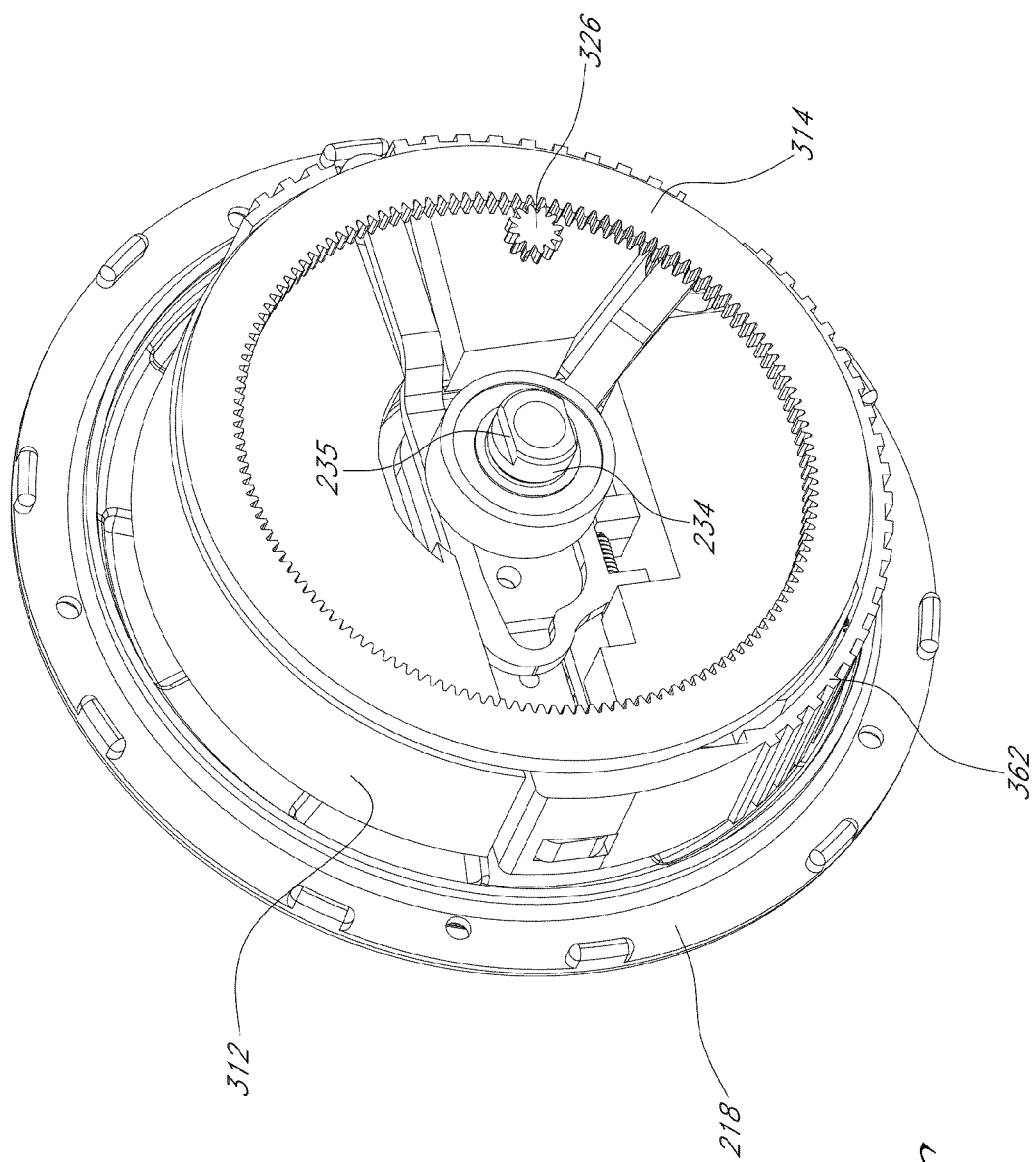
FIG. 3C is a perspective rear view of the hub of the wheel.

FIGS. 3A-3C schematically illustrate an embodiment of the wheel 212 that comprises a power system and a brake system. FIGS. 3A and 3B are front perspective views showing the arrangement in the hub 218 of internal components of the power system and the locking system. For clarity of presentation, the tire 213, which surrounds the circumference of the hub 218, and the hub's cover 221 are not shown in FIGS. 3A-3B. The internal components are prevented from rotating by attaching them to a chassis 312, which is rigidly attached to the non-rotating axle 234. In some embodiments, the chassis 312 is made from an electrically insulating material, for example, a plastic material such as nylon or ABS.

The power system comprises a generator 313, an electrical storage device 330, and control electronics. The generator 313 comprises a rotor 318 housed within a stator 322 and free to rotate therein. The generator 313 will be further described with reference to FIG. 3D. The power system control electronics can be fabricated on a printed circuit board assembly 334 (PCBA). The PCBA 334 is not shown in FIG. 3A in order to illustrate the electrical storage device 330 disposed within a cavity 333 in the chassis 312. FIG. 3B shows the PCBA 334 in place over the cavity 333.

The brake system comprises a brake motor 354, a drive mechanism 358, and a brake band 362. The brake system further comprises control electronics fabricated on the PCBA 334. In other embodiments, separate PCBA's can be used for the brake and the power system electronics. The brake motor 354 engages the drive mechanism 358 (e.g., a set of gears) to drive the brake band 362 into and out of contact with an inner surface 340 of the rotating hub 218. The brake motor 354 generally is a DC servo or stepper motor operable in a forward and a reverse direction. In some embodiments, the DC motor 354 has an operating voltage of about 5 V.

The brake system is operable between an unlocked and a locked state. In the unlocked state, the brake band 362 does not contact the hub 218, and the wheel is substantially free to rotate. In the locked state, the brake band 362 expands outward and contacts the hub 218. The inner surface 340 may include a series of protrusions 342 that engage notches in the brake band 362 to prevent rotation of the wheel 212. In other embodiments, different brake systems can be used such as, for example, the brake mechanisms disclosed in U.S. Pat. No. 5,598,144, issued on Jan. 28, 1997, entitled "ANTI-THEFT VEHICLE SYSTEM," or U.S. Pat. No. 6,945,362, issued Sep. 20, 2005, entitled "ANTI-THEFT VEHICLE SYSTEM." The disclosure of each of these applications is hereby incorporated by reference herein in its entirety. Moreover, in other embodiments a progressive brake mechanism, which provides a variable amount of braking force to the wheel 212, can be used.

FIG. 3C is a rear perspective view of the hub 218 that illustrates a mechanism that transmits the rotational motion of the wheel 212 to the generator 313. A drive gear ring 314 is attached to and rotates with the hub 218. The drive gear ring 314 engages a pinion gear 326 that is attached to the rotor 318 (see also FIG. 3D). Rotation of the wheel 212 causes the rotor 318 to rotate within the generator 313. The gear ratio between the drive gear ring 314 and the pinion gear 326 can be used to provide a suitable rotation rate for the rotor 318. In some embodiments, the gear ratio is 10:1 or 15:1, although other gear ratios can be used.

In some embodiments, the drive gear ring 314 is formed as a molded feature in a cover to the hub 218 or in the hub 218 itself. Through normal use, the drive gear ring 314 may become slightly noncircular or "out-of-round" and may not fully engage the pinion gear 326, which can lead to gear wear. Accordingly, some embodiments beneficially use secondary gearing that "floats" on the drive gear 314 and maintains solid contact with the pinion gear 326 to reduce gear wear even if the drive gear ring 314 becomes slightly noncircular.

a. Generator

Figure 3D:
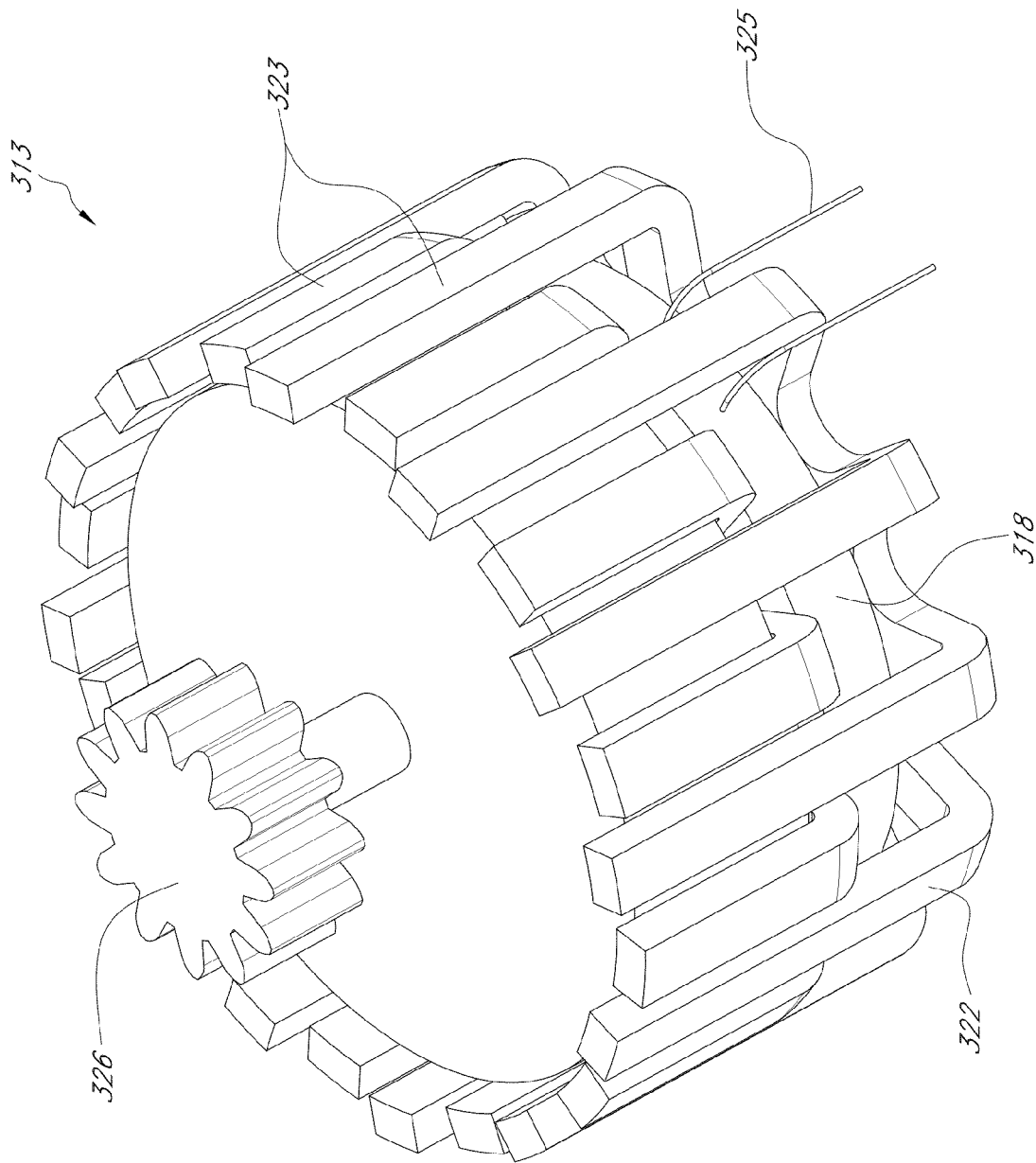
FIG. 3D is a perspective view of an embodiment of a generator sized to fit within the hub of the wheel of FIGS. 3A-3C.

FIG. 3D is a perspective view of an embodiment of the generator 313. In this embodiment, the stator 322 comprises a number of posts or legs 323 arranged in a generally cylindrical, cage-like configuration around the rotor 318. The rotor 318 is free to rotate within the stator 322 and comprises one or more generally cylindrically-shaped, magnetized disks The legs 323 of the stator 322 comprise the windings of the generator 313. Rotation of the rotor 318 within the stator 322 induces electric current to flow within the windings. The electric current is provided to other components via wires 325. For example, the wires 325 may connect the generator to the electric storage device 330 and the PCBA 334.

The generator 313 produces an AC current. In this embodiment, the generator 313 is a 24-pole generator that produces 12 cycles of electric power for each rotation of the rotor 318. In other embodiments, a different number of poles can be used. In other embodiments, the generator 313 can include brushes, slip rings, and/or commutators to provide a DC current. However, brushes, slip rings, and commutators are subject to frictional wear and impairment and require periodic adjustment or replacement. Embodiments not using these components advantageously reduce the need for generator maintenance and are particularly beneficial in environments (such as a retail store's outdoor parking lot) where the generator is subject to dirty and shock-prone conditions.

Generally, the power output of the generator 313 is roughly linearly proportional to the rotor's rotational rate. The gear ratio between the drive gear ring 314 and the pinion gear 326 can be selected so that the generator 313 produces a suitable amount of power for wheel speeds typically encountered in an implementation. For example, in an embodiment suitable for use in a retail store 110 environment (FIG. 1), the shopping cart 122 is generally moved at normal walking speeds in the range from about 1 ft/s to about 5 ft/s. The outer diameter 214 of a standard shopping cart wheel 212 is about 5 inches. Accordingly, at normal walking speeds the wheel 212 rotates in the range from about 50 revolutions per minute (rpm) to about 250 rpm. If a gear ratio of 10:1 is used, and the generator 313 has 24 poles, then one wheel rotation produces 120 cycles of electrical power. Such an embodiment of the generator 313 provides electrical power in the range from about 80 mW to about 400 mW. An embodiment of the wheel 212 having a gear ratio of 15:1 provides about 120 mW to about 600 mW of electrical power.

In the generator embodiment shown in FIG. 3D, the rotor 318 comprises a permanent magnet that rotates within the stator 322. In other embodiments, the rotor 318 and/or the stator 322 may include one or more electromagnets, which allows for variable power output from the generator 313. In such embodiments, the power output can be adjusted the power system control circuit based on, for example, charging needs, instantaneous power consumption, the electrical load fed by the generator 313, etc.

b. Electrical Storage Device

The power system includes the electrical storage device 330, which in certain embodiments, comprises one or more capacitors. For example, FIG. 3A shows an embodiment utilizing two capacitors 330. In certain preferred embodiments, capacitors having a high capacitance are selected because of their ability to store relatively large amounts of electrical energy. For example, in certain embodiments, the electrical storage device 330 comprises one or more ultracapacitors. Because some ultracapacitors have voltage limits (e.g., about 2.5 V) that are less than the voltage needed to operate certain systems on the object (e.g., a braking system), various embodiments use a bank of capacitors connected in series to provide a higher working voltage. In certain such embodiments, the capacitor bank may comprise two, three, four, five, or more capacitors. In other embodiments, the capacitor bank is connected in parallel or in series/parallel combinations.

As is well known, any real capacitor has an internal electrical resistance known as the equivalent series resistance (ESR). It is preferable, although not required, for capacitors used in the electric storage device 330 to have a low equivalent series resistance (ESR) so as to provide a high electric power discharge rate. In some embodiments, the ESR of the capacitors is less than about 1 Ohm.

In some embodiments, the electric storage device 330 comprises a series capacitor bank comprising two Cooper-Bussmann PowerStor® Aerogel Capacitors B1010-2R5155 (Cooper Electronic Technologies, Boynton Beach, Fla.), each rated at a capacitance of 1.5 F and a working voltage of 2.5 V.

This device provides a maximum working voltage of about 5 V. In another embodiment, the capacitor bank comprises three Cooper Bussmann PowerStor B0830-2R5475 1.6 F EDLC ultracapacitors connected in series to produce a 7.5 V maximum working voltage and a nominal ESR of about 0.45 Ohms. In different embodiments, different numbers of ultracapacitors can be used. Other suitable ultracapacitors include: a Maxwell Boostcap® PC10 EDLC (Maxwell Technologies, San Diego, Calif.); a Nesscap ESHSR-0003C0-002R7 EDLC (Nesscap Corp., Kyongg-Do, Korea); an Eppscore AC1020 ultracapacitor (Eppscore Corp., Seoul, Korea); and an EPCOS B49100A1104M00 ultracapacitor (EPCOS AG, Munich, Germany).

The electric storage device 330 may comprise additional electronic components, including, for example, capacitors, diodes, resistors, inductors, transistors, regulators, controllers, batteries, and any other suitable electronic device. In some embodiments, the additional electronic components assist in storing and discharging electrical energy and in directing the electrical energy to suitable systems. Although the embodiment of the storage device 330 shown in FIG. 3A comprises two ultracapacitors, this is not a limitation. For example, in some embodiments, the electric storage device 330 includes one or more batteries (disposable and/or rechargeable), one or more lower capacity capacitors, and/or one or more fuel cells. It is contemplated that the electric storage device 330 may use any type of device, component, or system configured to store electromagnetic energy, including those now existing and those to be developed in the future.

In some embodiments, the electric storage device 330 further comprises a backup battery that can be used to power various on-board systems if the capacitor bank discharges below a minimum operating voltage suitable for the on-board systems. The backup battery may comprise disposable and/or rechargeable batteries. In certain embodiments, electrical power from the generator 313 is used to charge the backup battery.

In another embodiment, the electrical storage device 330 comprises one or more Lithium Vanadium Pentoxide rechargeable batteries (e.g., Panasonic VL3032 100 mAh cells). Because the self-discharge rate of Lithium Vanadium Pentoxide batteries (about 2% per year at room temperature) is significantly lower than the self-discharge rate of many commercially available EDLC's, this embodiment may beneficially be used in implementations that have low power needs and long term energy storage needs after the generator stops producing electricity (e.g., when the wheel stops rotating). In other embodiments, the electrical storage device 330 comprises rechargeable batteries utilizing other types of battery chemistry including, for example, Manganese Dioxide Lithium battery chemistry (e.g., Sanyo ML1220 cells).

Lithium Vanadium Pentoxide batteries have different electrical characteristics compared to ultracapacitors. For example, they have higher energy capacity (e.g. for a Panasonic VL3032, 100 mAh·2.7 V=about 1000 Joules compared to one to tens of Joules for low-cost, commercially available ultracapacitors), much lower power, and relatively slow charging rate (e.g., about 4 mA). Accordingly, implementations using Lithium Vanadium Pentoxide batteries rather than ultracapacitors will generally have higher energy capacity, but low power and current, and slow charging rate requirements.

In another embodiment, the electrical storage device 330 comprises two or more devices utilizing different energy storage technologies, e.g., an ultracapacitor and a rechargeable battery such as, e.g., a Lithium Vanadium Pentoxide or Manganese Dioxide Lithium battery. This embodiment may advantageously be used in an implementation where there is a need for significant current (e.g. greater than about 200 µA) in a time and motion profile which meets the ultracapacitor discharge profile (e.g., no significant current is needed after a few days without charging), but where some smaller energy storage is needed on a much longer time scale (e.g., for weeks, months, or years after the wheel stops rotating).

In other embodiments, the electrical storage device 330 may comprise batteries having other types of rechargeable battery chemistry (e.g., NiMH or lithium ion). For example, the volumetric energy density of some NiMH batteries is higher than that of some ultracapacitors, and the self discharge rate is somewhat lower, which may make them suitable for some implementations. However, for most implementations, the rapid charging, high cycle count, and high available discharge current of ultracapacitors makes them a preferred embodiment for the electrical storage device.

c. Alternative Embodiments

Figure 3E:
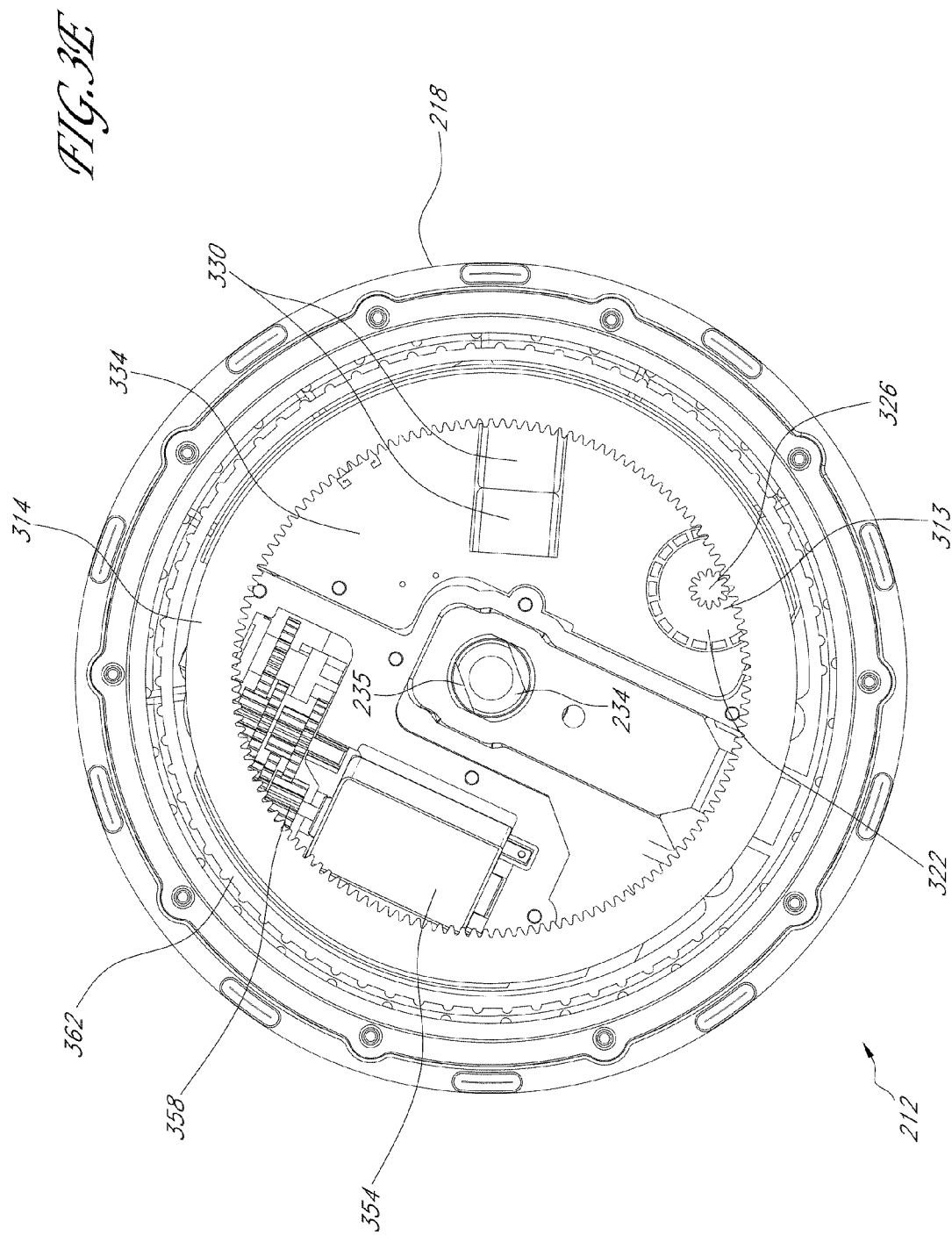
FIG. 3E is a cross-section view of another embodiment of a wheel comprising a power system and a brake system.

The components of the power system and the brake system can be configured differently than shown in FIGS. 3A-3C. For example, FIG. 3E is a plan-view that schematically illustrates an alternative arrangement of the above-mentioned components within the wheel 212.

In the embodiments illustrated in FIGS. 3A-3E, all the components of the power and braking systems are contained within the wheel. However, in other embodiments, some or all of these components can be disposed outside the wheel 212. For example, some or all of the components can be disposed in an enclosed plastic housing that forms part of the wheel assembly or caster. In embodiments suitable for carts, some or all of the components can be disposed in or on the frame or the handlebars of the cart. In some embodiments, the power system and the brake system are disposed in different locations in the object. For example, the brake system can be disposed in a first wheel and the power system can be disposed in a second wheel. As will be recognized, there are many possible variations for the configuration and layout of the power system and braking system.

d. Powering Off-Wheel Systems

The power system can provide power to systems and components both inside the wheel ("in-wheel" systems) and outside the wheel ("off-wheel" systems). FIGS. 3A-3E illustrate embodiments wherein the power system provides power to an in-wheel system (e.g., the brake system).

However, in other embodiments, systems such as a navigation system or a two-way communications system may be disposed in other places on the object (including in a different wheel than the power system). For example, in some preferred embodiments, a display, monitor, or other suitable input/output device (e.g., audio speakers and/or a microphone) is mounted to a portion of the object such as, for example, a handle on a shopping cart. The display may include a display screen, such as a touch screen, that is viewable by a person pushing the object. The display can be used to display information received from other systems on the object (e.g., a navigation system, a two-way communication system, an anti-theft system, etc.). For example, the display may show a graphic illustrating the position of the object within a facility. The display may be connected to other controllers, processors, and/or transceivers and configured to output additional information. In embodiments suitable for a retail store, the display may have a card reader or wand that enables customer to swipe a customer loyalty card or another type of card that identifies the customer. In these embodiments, a transceiver on the object may be configured to convey the customer identifier (as well as position information from a navigation system) to a remote transceiver (or an access point) such that this identifier (and position information) can be associated with other information received from the cart during the customer's shopping session. Further information related to tracking the locations and monitoring the status of objects (such as shopping carts) is disclosed in the Two-Way Communication Patent Application and further information related to determining the position of an object is disclosed in the Navigation Patent Application. The power system disclosed herein can be used to power such a handle-mounted display.

In certain embodiments, the power system uses an electrically split axle to transmit electrical power from the wheel to other potions of the object. In the embodiment shown in FIG. 4A, power from the power system is routed to the PCBA 334 which is connected by wires 378 to the axle 234. The axle 234 comprises two electrically conductive (e.g., metal) pieces 234a and 234b that are press fit with a first insulating spacer 374a between them to keep the wires 378 from shorting the two pieces 234a, 234b together. The axle piece 234b has a step 280 that ensures proper spacing of the axle pieces 234a, 234b and that provides pressure on the spacer 374a to ensure proper insulation between the pieces 234a, 234b. A second insulating spacer 374b prevents the bolt 228 from shorting the pieces 234a, 234b. The insulating spacers 374a and 374b may be made of suitable electrically nonconductive plastic materials such as, for example, nylon. A step corresponding to the step 280 in the axle piece 234b may be molded into the second spacer 374b so that when the bolt 228 is inserted into the axle piece 234b, friction will cause the second spacer 374b to be displaced to the position shown in FIG. 4A, which ensures proper electrical insulation of the bolt 228 from both of the axle pieces 234a and 234b. In some embodiments, the second spacer 374b substantially fills the entire length of the axle 234.

The wires 378 can be soldered to the PCBA 334 and to holes in the axle pieces 234a, 234b. Preferably, the surfaces of the two pieces 234a, 234b that are press fit are shaped (e.g., by keying or by a spline) to prevent the pieces 234a and 234b from rotating relative to each other. Although the PCBA 334 is shown as mounted to the axle piece 234a in FIG. 4A, in other embodiments the PCBA 334 is mounted to an insulated chassis (e.g., the chassis 312 in FIGS. 3A-3C), which is mounted to the axle 234.

Figure 4A:
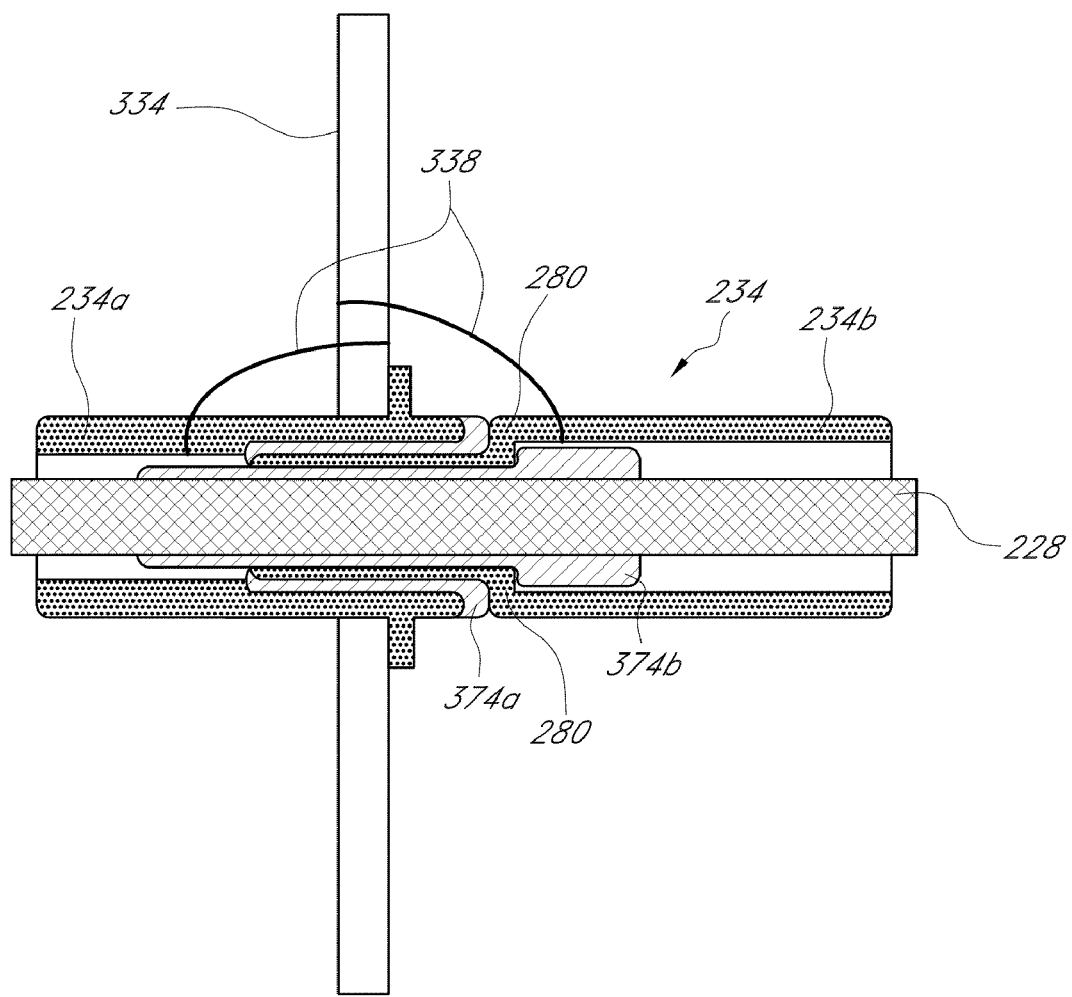
FIG. 4A is a cross-section view of an embodiment of an electrically split axle that can be used to route power from the wheel to off-wheel electrical systems.
Figure 4B:
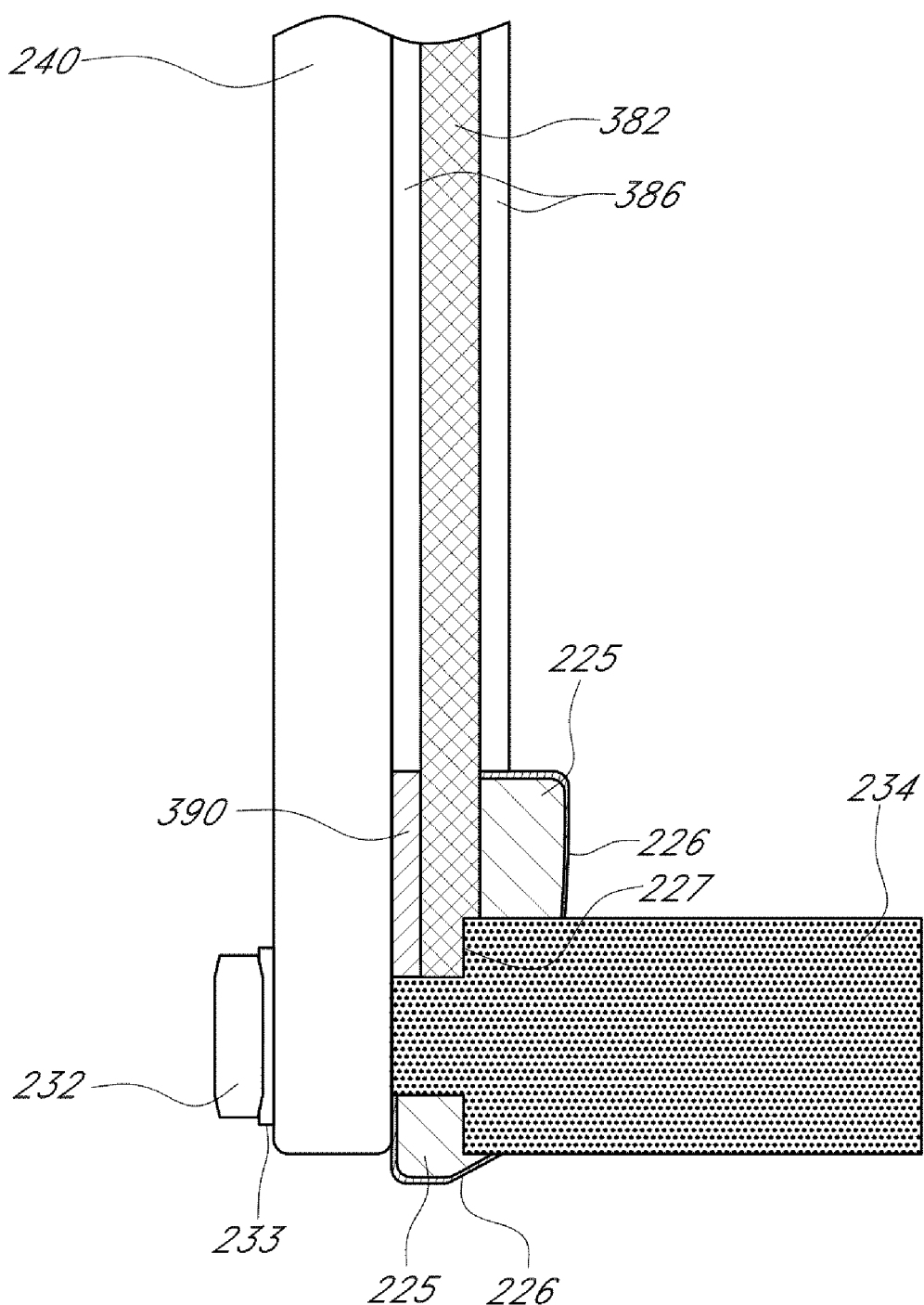
FIG. 4B is a cross-section view showing a portion of the wheel assembly connected to the electrically split axle

FIG. 4B is a cross-section view of a portion of the wheel assembly, looking parallel to the ground and perpendicular to the wheel's axis of rotation. In this embodiment, the caster 240 comprises a non-conducting material, such as a plastic material. The axle 234 engages the retaining clip 225 similarly as described with reference to FIG. 2B. The bolt 228 can be secured to the caster 240 by the nut 232 and a (preferably insulating) washer 233. The retaining clip 225 is metal with a hard insulating coating 226. The insulating coating 226 typically needs to support only a few volts of breakdown voltage; accordingly, relatively thin layers of coating may be used. In some embodiments, powder coated steel or anodized aluminum are used for the retaining clip 225 and insulating coating 226 The pressure of the flat portion 235 of the axle 234 on the retaining clip 225 keeps the retaining clip 225 in electrical contact with an electrically conductive wire 382 at point 227, thereby providing an electrical path for the power to flow from the axle 234 to the wire 382. In some embodiments, the retaining clip 225 includes a recess or slot for the wire 382 to ensure good electrical contact at the point 227. The wire 382 can be routed to any other portion of the object where power is desired, for example, by passing the wire 382 through cart frame tubes. An insulating element 390 attached to or molded into the caster 240 provides additional mechanical containment of the wire 382. The portion of the wire 382 outside the retaining clip 225 is covered by insulation 386.

The electrically split axle 234 shown in FIGS. 4A and 4B advantageously provides reliable electrical contact between each axle piece 234a, 234b and the wire 382, while electrically isolating any of the exposed surfaces of the wheel assembly. In certain embodiments, the electrical isolation provided by the wheel assembly shown in FIGS. 4A and 4B is sufficient for currents up to about 100 mA and contact resistances up to several tens of milliohms. Additionally, the electrical contact point 227 is protected from physical contact with moisture and electrolytic liquids (e.g., salt water), which beneficially avoids galvanic corrosion at the contact point 227, since typically the wire 382 and the axle 234 are dissimilar metals. In embodiments suitable for carts, the electrically split axle 234 is preferably used on a non-swiveling wheel (e.g., a rear shopping cart wheel). Also, in embodiments in which a two-way communication system and/or a navigation system are disposed in the wheel, fabricating the caster 240 from nonconductive materials beneficially provides from less electromagnetic interference with antennas and magnetic sensors, because there is less conductive (and/or ferromagnetic) material close to an antenna.

IV. Power Storage and Management System

Embodiments of a power storage and management system may include an energy storage device and a control circuit that manages the storage and usage of electrical power provided by a generator. The power storage and management system may be configured to be electrically connected to an electric generator such as, for example, the generator 313 in the wheel 212 (see FIGS. 2A-3E). The energy storage device may comprise one or more ultracapacitors and/or one or more rechargeable batteries. In some embodiments, the control circuit is used to regulate the charging and discharging of the electric storage reservoir (e.g., the electric storage device 330 in the wheel 212). The control circuit may comprise one or more microcontrollers, which can be configured to perform the control functions discussed herein via hardware, software, and/or firmware instructions.

In embodiments of the power management system that are connected to an AC generator (e.g., the generator 313 shown in FIGS. 3A-3E), it is preferable, but not necessary, for the control circuit to include a rectification circuit that converts the generator's AC current into a DC current. The rectification circuit can include a full-wave rectifier and/or a half-wave rectifier. In some embodiments, the rectification circuit comprises a single-phase, diode bridge rectifier having capacitive filtering. Further aspects of the rectification circuit are discussed below.

In embodiments of the electrical storage device using a capacitor bank (such as the capacitor bank 313, which is connected in series), the power system may use one or more charge balancing techniques to, for example, reduce the likelihood that one (or more) of the capacitors in the bank exceeds its maximum rated voltage. Since the capacitors in the bank will have a certain amount of variance in their individual capacitances, charge balancing can beneficially reduce variances in voltage across the capacitors and variances in charging times. Some embodiments provide charge balancing by using a resistor balancing network (typically in parallel with the capacitors) or a voltage comparator to direct excess charge to ground. In certain preferred embodiments, the power system control circuit monitors the charge on the capacitors so as to provide more accurate charge balancing over a wide range of charging conditions.

The power system control circuit may also monitor ambient temperature to correct for certain temperature-dependent effects found in ultracapacitors. In one of these effects, as the temperature decreases, the ESR of the ultracapacitor increases. Thus, the available energy the ultracapacitor can deliver to a high current load (e.g., a wheel locking mechanism) decreases as the temperature decreases. In another effect, as the temperature decreases, the voltage to which the ultracapacitor can be charged without permanently degrading the ultracapacitor's performance increases. To achieve a desired level of performance over an operating temperature range, these effects disadvantageously require selection of higher capacity ultracapacitors (which are more expensive), because the charging voltage must be calculated based on the highest operating temperature and the ESR must be based on the lowest operating temperature. Accordingly, in some embodiments, the power system comprises a temperature sensor, and the control circuit is configured to adjust the charging voltage based on the temperature so as provide more consistent performance across a wide temperature range. For example, in an embodiment, the control circuit charges the ultracapacitor to higher voltage at lower temperatures in order to compensate for the ultracapacitor's higher internal resistance (ESR) at lower temperatures. It is preferred, but not necessary, for the temperature sensor to be disposed in proximity to the ultracapacitors so as to measure their temperature more accurately. In some embodiments a separate temperature sensor is utilized. However, in other embodiments, one of the other components in the system may comprise a temperature sensor. For example, in one embodiment, the temperature sensor is a part of a transceiver disposed in the wheel 212 as part of a communication system.

The control circuit may also be configured to provide separate voltages to different on- or off-wheel systems. For example, the brake system may require a higher voltage (e.g., 5 V) and may draw more current than other electronic components (such as microprocessors and transceivers). Additionally, some electronic components preferably need a regulated voltage source, while other components (such as a brake motor) do not need regulated voltage. Accordingly, some embodiments of the control circuit provide beneficially provide two or more operating voltages, one or more of which may be voltage regulated.

Although in the embodiments shown in FIGS. 3A-3E the control circuit is disposed on the PCBA 334 in the wheel 212, this is not a requirement of the power system. In some embodiments, some or all of the control circuit is disposed in the wheel 212, in the wheel assembly 210, and/or elsewhere in the object such as, for example, in the frame or in the handlebars of a cart. Likewise, the electrical storage device 330 can be disposed in locations outside the wheel 212.

Further details of a power system that is suitable for use with a generator coupled to wheeled objects or other sources of energy are provided in U.S. patent application Ser. No. 11/277,029, filed on Mar. 20, 2006, entitled "POWER GENERATION SYSTEMS AND METHODS FOR WHEELED OBJECTS," hereinafter the "Wheel Power Generation System Application," the disclosure of which is hereby incorporated by reference herein in its entirety.

a. Example Power System Control Circuit for a Wheel Generator

As discussed herein, certain preferred embodiments of a wheel power system comprise a generator, an electric storage device, and a control circuit. Other embodiments may comprise an electric storage device and a control circuit, which are configured to be electrically connected to any suitable generator. The control circuit can be configured to perform a variety of functions in the power system such as, for example, regulating the charging and discharging of the electric storage device (including capacitors and/or batteries), charge balancing a bank of capacitors, regulating temperature dependent capacitor effects, and providing suitable power to electrical components both on and off the wheel. The control circuit may provide the electrical power to other electrical components from, for example, the generator, a capacitor, a battery, or some combination thereof.

An embodiment of a control circuit 400a will be discussed with reference to the circuit diagram shown in FIG. 5A. In this circuit diagram, bold lines indicate electrical paths through which power flows in the ordinary operation of the power system. Non-bold lines indicate electrical paths used for monitoring and/or control functions or for exception conditions. Table 1 shows examples of selected components used in the control circuit 400a.

TABLE 1

| Reference | Manufacturer | Part Number | Relevant Attributes |
|---|---|---|---|
| C1, C2 | Cooper Bussmann | B1010-2R5155 | 1.5 F capacitance, 0.3 Ohm ESR |
| D1-D6 | ON Semiconductor | MBR0520 | Low voltage drop at moderate current |
| Q1, Q2 | Fairchild Semiconductor | FDN337N | Low leakage in off state ($V_{gs} = 0$) |
| U1 | Microchip Technologies | MCP1700 | Low dropout voltage, low ground current |
| U2 | Atmel Corp. | ATMega168V | 1.8-V operation, low power, peripheral circuits (counter, timer, ADC) |

Figure 5A:
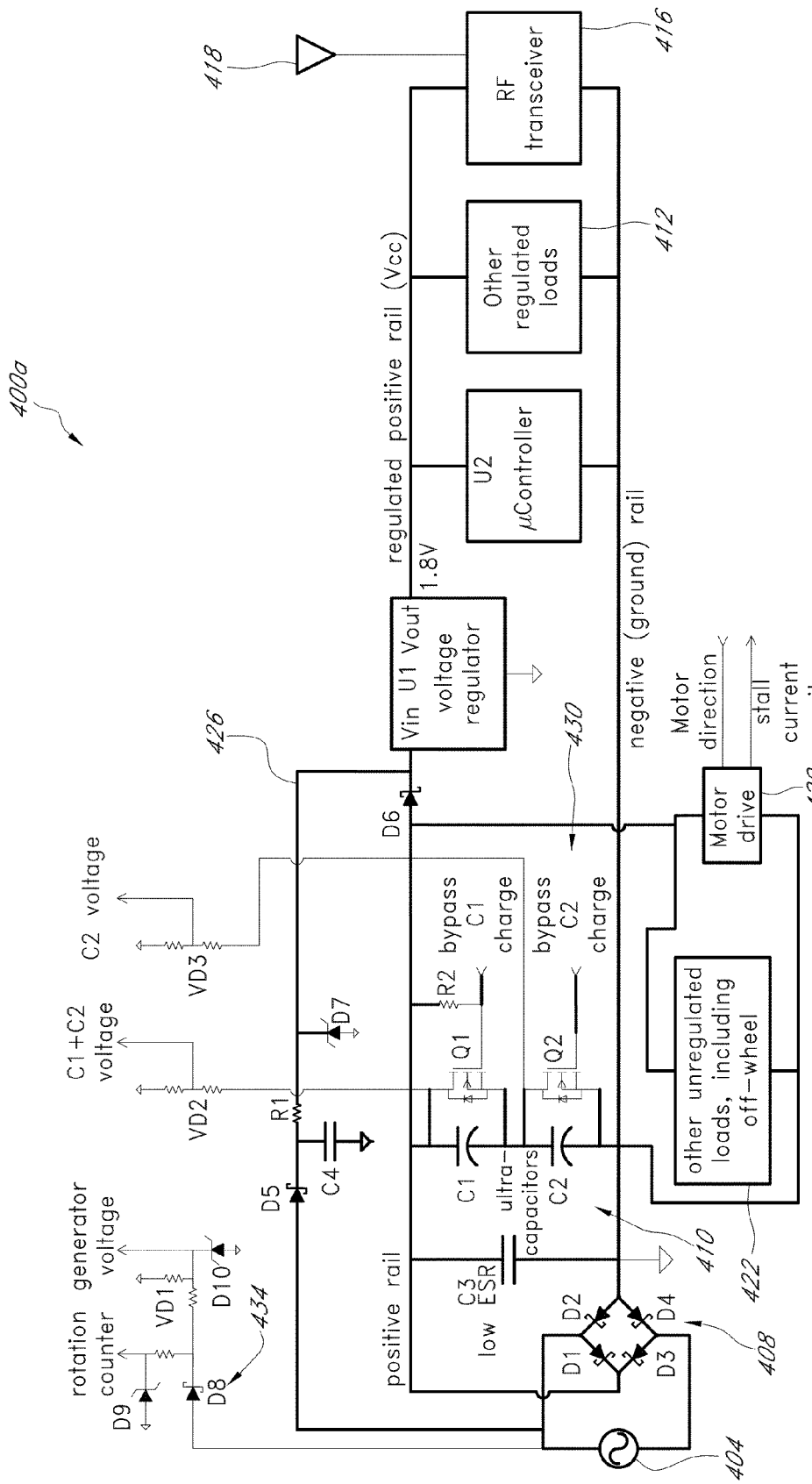
FIG. 5A is a circuit diagram of an embodiment of a control circuit configured to regulate the charging and discharging of a capacitor bank and to provide suitable voltages for other electronic devices. Note for FIGS. 5A-6B and 6D: all signals terminated like this: > are monitor inputs to the microcontroller. All signals terminated like this: < are control outputs from the microcontroller.

As shown in FIG. 5A, a generator 404 provides power to the circuit 400a. In this embodiment, the generator 404 comprises an AC generator that produces an AC current. The AC current is passed to a rectifier 408, which in this embodiment is a full-wave rectifier. The power from the generator 404 is directed to an electrical storage device 410, which in this preferred embodiment is a capacitor bank comprising ultracapacitors C1 and C2 connected in series. In other embodiments, the electrical storage device 410 further comprises a small capacity, low self-discharge backup battery, which is used to power other electrical components if the ultracapacitors C1 and C2 discharge below a minimum operating voltage for the other components.

The generator 404 provides unregulated power to various system loads such as, for example, a motor drive 420 that actuates a wheel locking or braking mechanism and other unregulated loads 422. Some of these loads, such as the motor drive 420, require relatively high power but only at intermittent times (e.g., to lock or unlock the wheel). For example, some embodiments of the brake system may require about 4 Joules of energy delivered at source voltages greater than about 2 V to perform a lock/unlock cycle.

The generator 404 also provides regulated power to other system loads such as, for example, a microcontroller U2 and a radio frequency (RF) transceiver 416 (with antenna 418). The generator 404 may also power other regulated loads such as, for example, a navigation system, a communication system, a display, and other processors and controllers. The power from the generator 404 is regulated by a voltage regulator U1, which in some embodiments comprises a low dropout (LDO) voltage regulator. In the example circuit 400a, the voltage regulator U1 provides a stable output voltage of 1.8 V, which is suitable for the microcontroller U2. In other embodiments, the regulated voltage may range from about 1.5 V to about 5 V. One embodiment provides a higher regulated voltage by using a boost DC-DC converter.

Various features of the example control circuit 400a will now be discussed with reference to FIG. 5A and the example components listed in TABLE 1.

i. Capacitor Bank Charging

The AC output of the generator 404 is rectified by the full wave rectifier 408, which comprises diodes D1-D4. In order for the ultracapacitor bank 410 to be charged, the generator's peak voltage must be greater than a charging voltage which is equal to twice the voltage drop across the diode D1 plus the current series voltage on the ultracapacitor bank 410 (e.g., C1 and C2). In various embodiments using Schottky diodes for D1-D4 (e.g., MBR0520 diodes from ON Semiconductor), the forward drop is about 275 mV minimum per diode for any reasonable charging current (e.g. about 100 ma at room temperature).

Power is available from the generator 404 to power the regulated loads (e.g., microcontroller U2, the RF transceiver 416, and other regulated loads 412) once the voltage across the ultracapacitor bank 410 exceeds the minimum operating voltage of the voltage regulator U1 (e.g., about 2.3 V for the MCP1700 LDO from Microchip Technologies) plus the forward drop of diode D6 at the regulated load current (e.g., about 200 to 250 mV depending on load current).

ii. Bootstrap Power

When the capacitor bank 410 (e.g., C1 and C2) has discharged to the point where the capacitor bank 410 is below the dropout voltage for the regulator U1, the microcontroller U2 can no longer operate reliably from the stored energy in the capacitor bank 410. A bootstrap power path 426 through diode D5 provides a secondary, low current, half wave rectifier for the power output of the generator 404. The generator 404 charges a reservoir capacitor C4 relatively quickly. A resistor R1 causes load current to be pulled preferentially from the full wave rectifier 408 (e.g., diodes D1-D4) once the ultracapacitor bank 410 has charged above the minimum operating voltage for the voltage regulator U1. Diode D7 limits the voltage through the bootstrap power path 426 to the maximum allowable input voltage of the voltage regulator U1 (e.g. 6.0 V for the MCP1700).

In a representative embodiment, a minimum output frequency of the generator 404 is about 100 Hz, and the mean load current of the microcontroller U2 plus the RF transceiver 416 is on the order of 2 milliamps. Accordingly, the charge which the reservoir capacitor C4 must deliver across one 10 millisecond cycle of the generator 404 is no more than about 20 microCoulombs. A 50 µF capacitor may be used for the reservoir capacitor C4 and will deliver about 20 microCoulombs of charge with a voltage drop of about 0.4 V. Therefore, in such an embodiment, the bootstrap charging voltage for the reservoir capacitor C4 need only be about equal to the minimum charging voltage of the voltage regulator U1 plus the voltage drop across the reservoir capacitor C4. The bootstrap charging voltage is about 2.7 V if the voltage regulator U1 is an MCP1700 (Microchip Technologies). The bootstrap charge on the reservoir capacitor C4 is sufficiently low that even a relatively low power generator 404 will be able to charge the reservoir capacitor C4 to the minimum charging voltage of the voltage regulator U1 within a few seconds of rotational motion. Accordingly, use of the bootstrap power path and the reservoir capacitor C4 advantageously permits regulated loads to operate within a few seconds of motion of the object, even if the ultracapacitor bank 410 is fully discharged.

iii. Charge of the Capacitor Bank

As discussed above, it is preferable, but not necessary, to charge balance two or more capacitors connected in series, because the capacitors (e.g., C1 and C2) will have some variance in their capacitance. For example, two nominally identical ultracapacitors can differ in their actual capacitance by a factor of about two. The Cooper Bussmann B1010-2R5155 EDLC ultracapacitor has a manufacturing tolerance of −20% to +80% based on the nominal 1.5 F capacitance value. Moreover, an ultracapacitor can be damaged if its maximum charge voltage is exceeded. Since the amount of charge carried on two series capacitors is the same, the maximum charge voltage will be limited by the need to avoid overcharging the lowest capacitance ultracapacitor, if there is no means of steering charge to or from the individual ultracapacitors of the bank For example, in a two-capacitor bank, if the maximum charge voltage is 2.5 V, and one nominally 1.5 F ultracapacitor has a capacitance that is 10% low, e.g., 1.35 F, while the other has a capacitance that is 70% high, e.g., 2.55 F, then 3.375 Coulombs is needed to charge the 1.35 F capacitor to 2.5 V. However, this amount of charge will charge the larger capacity ultracapacitor to only 1.32 V (e.g., 3.375 C/2.55 F). The total energy stored in the capacitor bank is the sum of the energies of the individual capacitors [e.g., $\frac{1}{2}$ C V$^2$], namely, $\frac{1}{2}*(1.35\ F*(2.5\ V)^2+2.55\ F*(1.32\ V)^2)$ or 6.4 Joules. Fully charging each ultracapacitor to 2.5 V stores $\frac{1}{2}*(1.35\ F*(2.5\ V)^2+2.55\ F*(2.5\ V)^2)$ or 12.2 Joules, almost twice the energy.

The charge balancing circuit 430 comprises one transistor for each ultracapacitor in the capacitor bank 410. For example, transistors Q1 and Q2 perform charge balancing between the ultracapacitors C1 and C2. If the ultracapacitors C1 and C2 are fully charged, each of the transistors Q1 and Q2 can be made conducting to avoid overcharging the ultracapacitors C1 and C2. In one preferred embodiment, the transistors Q1 and Q2 are N channel enhancement mode FETs such as, e.g., an FDN337N FET from Fairchild Semiconductor.

In the embodiment shown in FIG. 5A, charge balancing is monitored and performed by the microcontroller U2, which measures the voltages on the ultracapacitors C1 and C2. The voltage on ultracapacitor C2 is determined by performing an analog-to-digital conversion on the output of voltage divider VD3, while the output of voltage divider VD2 provides a measurement of the combined voltages on the ultracapacitors C1 and C2. Accordingly, the voltage on the ultracapacitor C1 can be found by subtraction. If the voltage on the ultracapacitor C1 is higher than the voltage on the ultracapacitor C2, the microcontroller U2 puts the transistor Q1 into conduction until the voltages equalize, and similarly if the voltage on the ultracapacitor C2 is higher than the voltage on the ultracapacitor C1. In this embodiment, the transistor Q1's gate drive is pulled up through a resistor R2 and pulled down via an open collector driver included in or attached to the microcontroller U2, because the microcontroller U2 can only drive an output high to the regulated positive rail $V_{CC}$ (e.g., 1.8V for the ATMega168V) rail. To put the transistor Q1 into conduction requires a positive Vgs across the transistor Q1 (e.g., >0.7 V for the FDN337N FET). If the ultracapacitor C2 is nearly fully charged, this voltage is above about 3.0 V.

Although a microcontroller U2 is used in the example control circuit shown in FIG. 5A to perform the power control functions, these functions may be performed using other types of components, such as an ASIC (Application Specific Integrated Circuit), an FPGA (Field Programmable Gate Array), a microprocessor, or some combination of the foregoing.

iv. Rotation Monitor and Voltage Measurement Functions

In certain embodiments, the object includes a navigation system that determines the position of the object. For example, in certain preferred embodiments, the position of the object is tracked via a dead reckoning method that measures the object's heading and the distance traveled by object. In certain such embodiments, the distance traveled by the object is determined by measuring the amount of wheel rotation (e.g., under the assumption that the wheel does not slide, slip, or skid). Further details of a suitable navigation system are discussed in the Navigation Patent Application.

In certain embodiments, the generator 404 can act as a wheel rotation sensor for the navigation system, because the generator voltage varies with a frequency that is proportional to the wheel rotation frequency. In the embodiment of the generator 313 shown in FIG. 3D, the frequency of the generator voltage equals the wheel rotation frequency multiplied by the gear ratio between the generator drive gear ring 314 and the pinion gear 326. Accordingly, in some preferred embodiments, the voltage produced by the generator 404 is monitored and used as a wheel rotation counter 434. As shown in FIG. 5A, the rotation counter 434 comprises a half wave rectifier, e.g., diode D8, which is voltage limited by a diode D9, and which provides a "rotation" input to the microcontroller U2. The rotation input can be counted by a counter circuit on the microcontroller U2 to determine the number of wheel rotations and thus, the distance traveled by the object. By suitably providing an elapsed time circuit (e.g., a clock on the microcontroller U2), the object's forward speed can be estimated from the number of wheel rotations and the elapsed time.

The diode D8 also provides an instantaneous measurement of the generator voltage during a positive half-cycle. The voltage measurement is reduced by the voltage divider VD1 to a suitable value for the range of an ADC on the microcontroller U2. A diode D10 also limits the voltage into the ADC in cases of extremely high generator voltage.

v. Wheel Brake Mechanism Drive

Power from the ultracapacitor bank 410 can be used to operate the motor drive 420 for the braking mechanism until the voltage on the ultracapacitor bank 410 is less than the minimum voltage needed to generate sufficient torque to disengage the brake. The minimum voltage depends on the details of the braking mechanism and the motor that drives the braking mechanism. In the embodiments shown in FIGS. 3A-3E, the minimum operating voltage is about 2.0 V.

The two-ultracapacitor bank 410 described herein has a worst case DC ESR after aging of about 1.5 Ohms and has a locking stall current on the order of 500 ma at 3.0 V. The voltage drop across the ultracapacitor bank 410 at locking stall is approximately 0.75 V in some embodiments. A buffer capacitor C3, having a low ESR, provides some buffering for high current transient loads such as, for example, the stall current of the motor drive 420 and the inductive kick from commutator switches in the motor drive 420.

It is preferable, but not necessary, for the brake mechanism's power source to be high compliance (e.g., having a low apparent source resistance). In the example circuit 400a shown in FIG. 5A, power is fed to the braking motor drive 420 (which may include a MOSFET H-bridge) directly from the ultracapacitor bank 410 in parallel with the buffer capacitor C3 but with no diodes in the path. Such a circuit provides high compliance power subject only to inherent limitations of the specific ultracapacitors chosen for the bank 410. If higher compliance is needed, then each series ultracapacitor in the ultracapacitor bank 410 can be replaced by two or more lower capacity ultracapacitors to reduce the circuit ESR. For example, two 300 milliohm ESR ultracapacitors connected in parallel have a circuit ESR of 150 milliohms. In some embodiments, a high-capacity high-ESR ultracapacitor is connected in parallel with a low-capacity, low-ESR ultracapacitor to form a high-capacity, low-ESR combination. For example, in one embodiment the high-capacity high-ESR ultracapacitor comprises a Cooper Bussmann B1010-2R5155 ultracapacitor, while the low-capacity, low-ESR ultracapacitor comprises a Cooper Bussmann A0820-2R5474 0.47 F, 150 milliohm ESR ultracapacitor.

vi. Decision Logic for Extended Time in a Wheel Lock State

In some situations, a wheel's brake mechanism is activated, and the wheel remains in the locked state for an extended period of time. Typically, energy stored in the ultracapacitor bank 410 is later used to unlock the wheel. However, the energy stored in the ultracapacitor bank 410 decays with time, because the ultracapacitors self-discharge. If the wheel is locked for too long a time period, the energy in the ultracapacitor bank 410 will be too small to unlock the wheel. At this point, the wheel will remain locked until commanded to unlock (e.g., by an authorized person who has a device that can issue a suitable unlock command). The energy to perform this unlock will have to come from an energy source other than the ultracapacitor bank 410. For example, in certain embodiments, a backup battery may contain sufficient energy to unlock the wheel. However, in other embodiments, the wheel will have to be supplied with power from an external source.

The ultracapacitor bank discharge time for the example embodiment depicted in FIG. 5A and TABLE 1 is typically a few days. However, the discharge time may be shorter if the ultracapacitor bank 410 was not fully charged before the wheel locked.

Certain embodiments of the control circuit 400a beneficially avoid leaving a wheel in an extended lock state, by unlocking the wheel at a point where the ultracapacitor bank 410 has just enough energy to perform a wheel unlock cycle. In such embodiments, the microcontroller U2 periodically monitors the charge state of the ultracapacitor bank 410 to determine whether the ultracapacitors have reached this point. After unlocking the wheel, the wheel can rotate freely, and the object (to which the wheel is attached) can be moved.

In certain situations, it may be undesirable to leave the wheel unlocked, because the object can be stolen. Accordingly, in some embodiments, the microcontroller U2 can be configured to implement the following decision logic in this situation. The decision logic depends on whether or not the wheel includes a backup power source (e.g., a backup battery).

In the case where the wheel does not have a backup power source, if the wheel begins rotating again, the microcontroller U2 waits until the ultracapacitor bank 410 has charged sufficiently to perform a complete lock/unlock cycle. The microcontroller U2 then signals the wheel to lock again. The rationale behind this decision logic is that the wheel initially locked correctly (e.g., the object was being stolen), and the object was then abandoned after the wheel locked. By subsequently unlocking the wheel, the decision logic acts under the assumption that unlocking the wheel when the ultracapacitor bank 410 has just enough energy left to unlock the wheel is unlikely to result in the object being moved again. Alternatively, if the cart does move after the microcontroller U2 unlocks the wheel, the rationale assumes that permitting the object to move far enough to recharge the ultracapacitor bank 410 will not significantly affect the object's chance of being ultimately recovered.

In an alternate embodiment of the decision logic, the wheel is immediately locked by the backup power supply if the wheel begins to rotate again. In this alternate embodiment, the rationale is that subsequent motion of the wheel is likely to lead to the loss of the object. In certain embodiments, different choices for the decision logic can be made when the control circuit 400a is initialized, for example, by storing a suitable flag in nonvolatile memory (e.g., EEPROM).

A further embodiment uses a low-current-capacity backup battery that is not capable of unlocking the wheel. In such an embodiment, the wheel is unlocked when the ultracapacitor bank 410 discharges to the point where it contains the minimum energy to reliably perform the unlock cycle. If the wheel is subsequently moved by an unauthorized person or in an unauthorized way, the microcontroller U2 waits until the ultracapacitor bank 410 is sufficiently charged so as to perform a complete lock/unlock cycle. The microcontroller U2 then signals the wheel to lock again. Certain embodiments of the wheel locking mechanism require a peak current of about 500 mA to perform an unlock cycle. Many commercially available batteries utilize battery chemistries that have a sufficiently high internal resistance that the current they produce is insufficient to lock or unlock various preferred embodiments of the brake mechanism.

vii. Auxiliary Backup Battery

In some embodiments, the wheel comprises an auxiliary backup battery that acts as a source of power when the energy in the ultracapacitor bank is low. The backup battery typically comprises a non-rechargeable battery such as an alkaline or primary lithium battery, although rechargeable batteries such as lithium ion batteries may be used in other embodiments. A float charge voltage is applied across the non-rechargeable battery in certain embodiments, which may reduce the self-discharge rate of the battery.

Figure 5B:
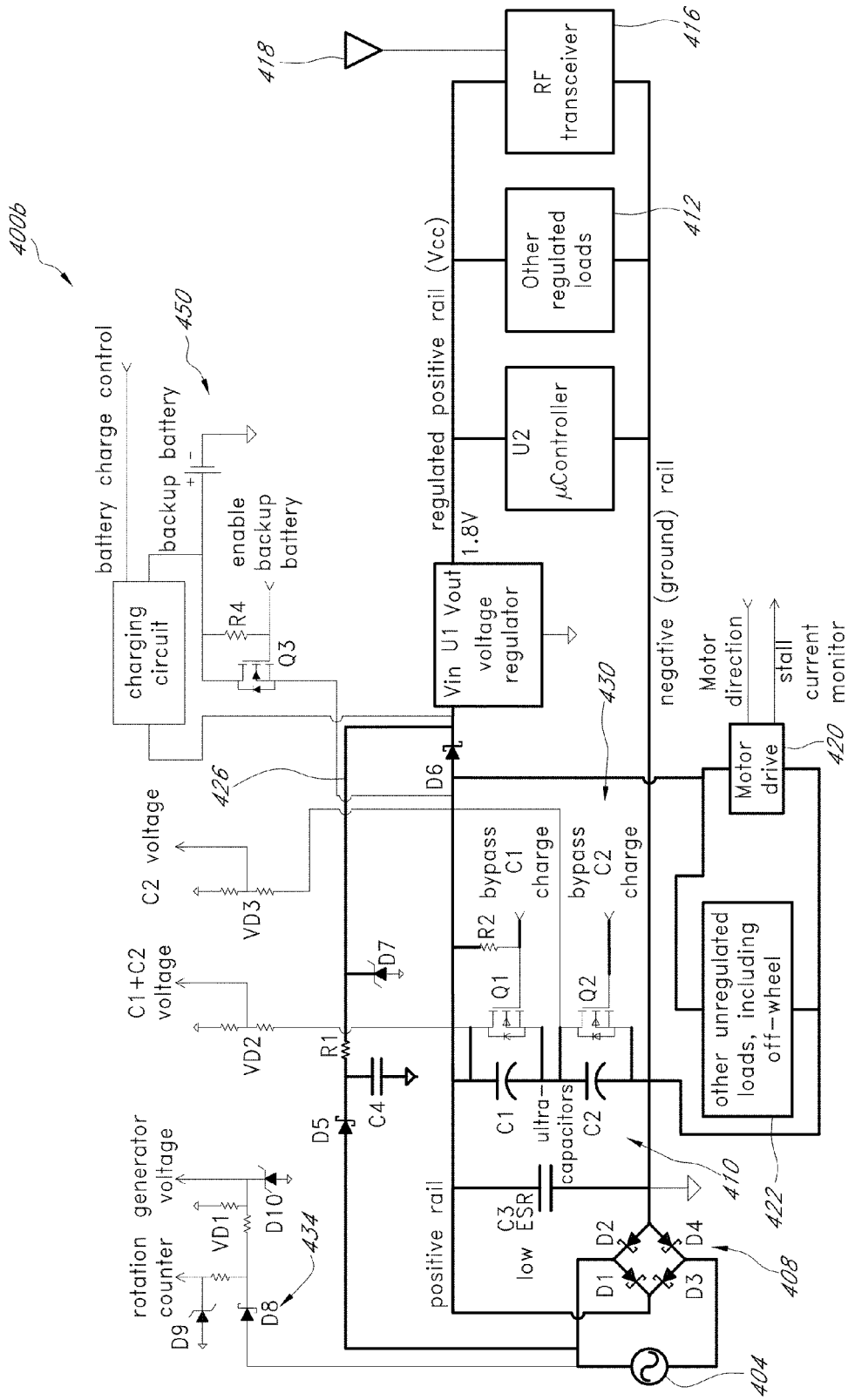
FIG. 5B is a circuit diagram of another embodiment of a control circuit including an optional backup power source.

FIG. 5B is a circuit diagram showing an embodiment of a power system control circuit 400b including a backup battery system 450 and an optional charging circuit 460 (used to recharge rechargeable backup batteries). The control circuit 400b is configured to provide power to unregulated loads 420 and 422 and the regulated loads U2, 412, and 416.

After a discharge time, an initially fully charged capacitor bank 410 will self-discharge to a point where the voltage is not high enough to power the voltage regulator U1. The microcontroller U2, which periodically monitors the voltage on the ultracapacitors C1 and C2, puts a transistor Q3 into conduction (e.g., the gate of the transistor Q3 is pulled up through a resistor R4 so that the transistor Q3 is fully saturated). When the transistor Q3 begins conducting, the backup battery will start charging the ultracapacitors C1 and C2, with a current limited by the ESR of the ultracapacitors C1 and C2. The microcontroller U2 then turns off the transistor Q3. The regulated loads then are powered by the energy transferred from the backup battery to the ultracapacitor bank 410, until the bank 410 again discharges sufficiently, at which point this cycle repeats.

If a wheel lock condition is detected and there is not enough energy in the ultracapacitor bank 410 to perform the lock, the microcontroller U2 puts the transistor Q3 into conduction so as to add enough charge to the ultracapacitor bank 410 to perform the lock, after which the microcontroller 410 turns off the transistor Q3. Similar decision logic applies if there is insufficient energy to perform an unlock.

In certain embodiments, the backup battery runs only the microcontroller U2 and the other regulated loads 412 and 416. In such embodiments, the control circuit 400b is modified by connecting the output of the transistor Q3 to the cathode side of the diode D6 (rather than the anode side as shown in FIG. 5B). The transistor Q3 is made conducting whenever the voltage of the ultracapacitor bank 410 is below the minimum needed to run the voltage regulator U1. In these embodiments, the diode D6 is included in the control circuit, regardless of whether the bootstrap power path 426 is used. Some embodiments beneficially use the backup battery system 450 instead of the bootstrap power circuit (e.g., the portion of the circuit including the diodes D5, D6, D7, the capacitor C4, and the resistor R1).

viii. Powering an Ultracapacitor Bank

A test was performed to measure properties of one embodiment of the power system. The ultracapacitor bank comprised three Cooper Bussmann PowerStor B0830-2R5475 EDLC ultracapacitors (1.6 F and 0.45 Ohm nominal ESR) in series. The ultracapacitor bank had a maximum working voltage of 7.5 V. Diodes D1-D4 in the full wave rectifier were BAT54T Schottky barrier diodes (Diodes Inc, Westlake Village, Calif.), which were chosen for their low forward drop at low currents. A Zener shunt regulator LM432 (National Semiconductor Corp., Santa Clara, Calif.) was connected in parallel with the ultracapacitor bank to limit the voltage drop across the bank to be about 7.2 V.

TABLE 2

| time (s) | test voltage (V) | simulation voltage (V) | average power to ultracap (mW) | average current (mA) | worst case diode + ESR drop (V) | estimated power generated (mW) |
|---|---|---|---|---|---|---|
| 10 | 1 | 1.2 | 78 | 157 | 1.5 | 315 |
| 17 | 1.5 | 1.8 | 140 | 112 | 1.4 | 291 |
| 24 | 2 | 2.2 | 196 | 112 | 1.3 | 345 |
| 32 | 2.5 | 2.7 | 220 | 98 | 1.3 | 352 |
| 42 | 3 | 3.2 | 215 | 78 | 1.2 | 312 |
| 51 | 3.5 | 3.6 | 283 | 87 | 1.2 | 391 |
| 61 | 4 | 4.0 | 294 | 78 | 1.2 | 391 |
| 72 | 4.5 | 4.4 | 303 | 71 | 1.2 | 390 |
| 85 | 5 | 4.9 | 286 | 60 | 1.0 | 348 |
| 100 | 5.5 | 5.4 | 274 | 52 | 1.1 | 330 |
| 114 | 6 | 5.8 | 322 | 56 | 1.0 | 378 |
| 132 | 6.5 | 6.3 | 272 | 44 | 1.0 | 315 |
| 152 | 7 | 6.8 | 264 | 39 | 0.9 | 301 |
|  |  |  | mean power harvested (mW) | 253 | estimated mean power generated (mW) | 340 |

TABLE 2 shows the results of an experiment on the test embodiment power system. The generator (shown in FIG. 3D) was driven by a mechanical drill motor, thereby providing a sinusoidal generator output with an approximate frequency of 330 Hz and a wheel rotation of approximately 165 RPM. The voltage across the ultracapacitor bank was recorded as a function of time while the generator was in motion. In TABLE 2, results in the column labeled "Worst case diode drop+ESR drop (V)" were estimated from the diode datasheet at twice the average current for each voltage step (note that there are two diode drops, e.g., D1 and D4, for the positive generator phase). Also, the ESR was taken from the ultracapacitor datasheet (and may be somewhat conservative).

TABLE 2 also shows the results of a discrete time simulation which treated the generator as a constant power source regardless of load current. In this simulation, it was assumed that the generator produced an instantaneous power of $(\pi/2) \cdot 0.31 (mW) \cdot \sin \omega t$ and produced a maximum voltage of $13(V) \cdot \sin \omega t$. The discrete time simulation modeled the diode voltage drop across the full wave rectifier according to an exponential fit, which had an accuracy of about 0.05V over the voltage ranges in the test. TABLE 2 shows that the results of the discrete time simulation are close to the test results, with the simulation results being slightly more optimistic at low ultracapacitor charge levels and slightly more pessimistic at higher charge levels The results in TABLE 2 show that one embodiment of the power system operating at speeds typical of a cart propelled by human locomotion is able to produce an average usable power of about 250 mW. The total energy that can be stored in an ultracapacitor bank comprising two Cooper Bussmann B1010-2R5155 EDLC's nominally rated at 1.5 F and having a working voltage of 5.0 V is 9.4 Joules, which can be harvested in less than about 40 seconds of use with this embodiment. At a walking speed of about 2 ft/sec, the object is moved through a distance of about 80 feet to fully charge the ultracapacitor bank. Accordingly, an ultracapacitor bank disposed in a wheeled object (e.g., a shopping cart) is likely to be rapidly charged by certain embodiments of the generator disclosed herein.

In some embodiments, the ultracapacitor bank can hold its charge for several days or longer, which is typically much longer than the time intervals between when the object is moved (and the generator is operated). Thus, for example, in a retail store environment the ultracapacitor bank will likely remain fully charged with even moderate and intermittent use by customers. In the event that a cart is removed from a confinement area surrounding the retail store, the ultracapacitor bank will contain sufficient stored electrical energy to actuate a locking mechanism to inhibit theft of the cart.

V. Example Power Management System

As discussed above, embodiments of the disclosed power management systems and methods can be configured to be used with any suitable AC or DC generator. The generator may, but need not, be disposed in a wheel and may, but need not, utilize rotational energy to produce electricity. Various embodiments of the power management system can provide, for example, power storage functions, power management functions, and power regulation functions, or a combination thereof, depending on the particular application. The power management system may advantageously provide substantially continuous power levels to electrical loads when the power system is used with a generator that produces electric power from an intermittent and/or fluctuating source of energy. The power management system may also regulate the storage of electrical power in an energy storage reservoir comprising, for example, capacitors (e.g., preferably one or more ultracapacitors) and batteries (e.g., preferably one or more rechargeable cells). The power management system may also be used with other electric storage devices including fuel cells, non-rechargeable batteries, etc.

In certain preferred embodiments, the power management system maintains the charge stored in the electric storage reservoir for an extended period of time. For example, in embodiments in which the generator and power management system are housed in a wheel of a cart (e.g., a shopping cart), the charge can be stored on time periods ranging from days, to months, to years. The power management system may be configured to buffer the energy stored in the energy reservoir and to provide relatively low voltage DC power. In some embodiments (such as the cart wheel embodiment described above), the power management system can provide power at currents up to several amperes, with a total energy delivery of about twenty Joules. Embodiments of the power management system may achieve the same performance level as other power control circuits but at lower cost.

The power management system comprises an energy storage reservoir that can be electrically connected to an electric generator. The energy storage reservoir preferably comprises a bank of one or more ultracapacitors and a bank of one or more rechargeable batteries.

The ultracapacitor bank in the energy storage reservoir comprises one ultracapacitor in some embodiments, but in certain preferred embodiments, the ultracapacitor bank comprises two (or more) ultracapacitors. It is preferred, but not necessary, for the equivalent series resistance (ESR) of the ultracapacitor bank to be sufficiently low that the ultracapacitor bank not only can service a relatively high current load but can also receive and store energy from the generator at a relatively high power level.

The rechargeable battery bank in the energy storage reservoir comprises one battery in some embodiments; however, in other embodiments, two or more rechargeable batteries can be used. The rechargeable battery bank advantageously can be configured to provide charge to the ultracapacitor bank as one or more of the ultracapacitors in the ultracapacitor bank undergoes self-discharge. It is preferred, but not necessary, to utilize rechargeable batteries that have a high energy capacity, a sufficiently low self-discharge rate, a large cycle count, and a simple charging process (e.g., at constant voltage). In some applications, it is desirable for the battery to be operable over a relatively wide temperature range, for example, −20 C to +50 C. In certain preferred embodiments, rechargeable batteries using a Manganese Dioxide Lithium battery chemistry are used; however, other rechargeable battery chemistries may also be used including, for example, Lithium Vanadium Pentoxide battery chemistry. One example of a suitable Manganese Dioxide Lithium rechargeable battery is an ML1220 cell available from Sanyo Energy (USA) Corporation (San Diego, Calif.). One example of a suitable Lithium Vanadium Pentoxide rechargeable battery is a VL1220 cell available from Panasonic Corporation of North America (Secaucus, N.J.).

In some embodiments of the power management system, suitable rechargeable batteries may have some or all of the following properties: working voltages in a range from about 2 V to about 3 V; a capacity in a range from about 1 mAh to about 50 mAh; a self discharge time of about 2% per year; a cycle life from about 3000 cycles for shallow discharges (e.g., 5%) to 100 cycles for deeper discharges (e.g., 50%); and charge and discharge currents less than about 1 mA.

The power management system also comprises an electronic controller configured to control storage of energy in the energy reservoir and to control power usage from the reservoir and/or the generator. The electronic controller may be configured to provide buffering of electrical power to one or more electric loads from electric power produced by the generator and/or electric power stored in the energy storage reservoir. Embodiments of the power management system can provide buffered power to electric loads on one or more timescales, which can depend on the particular application.

For example, a first timescale corresponds to the rate at which an ultracapacitor can discharge due to its internal resistance when coupled to an electric load that can absorb energy as quickly as the ultracapacitor can provide energy. In some embodiments, this first timescale is about a tenth of a second. Embodiments of the power management system can be configured to provide low-resistance power buffering to an electric load that requires high peak currents (e.g., an electric motor that requires high starting torque to overcome resistance, such as stiction, in a mechanical load). In such applications, one or more ultra-low ESR ultracapacitors may be used in the ultracapacitor bank. For example, a Cooper-Bussman A series ultracapacitor (Cooper Electronic Technologies, Boynton Beach, Fla.) has an internal resistance lower by a factor of about ten than other ultracapacitors of roughly the same physical volume and cost and can be used in the power management system to provide a maximum sustained power in a range from tens to hundreds of Watts over the first timescale.

A second timescale corresponds to the rate at which the battery bank can recharge the ultracapacitor. For certain battery chemistries (e.g., lithium vanadium pentoxide or manganese dioxide lithium), this second timescale may be on the order of hours per Joule delivered to a load, because the maximum working current is relatively low (typically a few milliamps). For example, in an application requiring about ten Joules of energy, the second timescale may be about ten to twenty hours or more. In the absence of electrical power generation by the generator, the average power sustainable on this second timescale may be on the order of milliwatts.

The electronic controller may be configured to be responsive to various control signals. For example, the control signal may be indicative of a level of charge (and/or voltage) on one or more of the ultracapacitors in the ultracapacitor bank or indicative of a level of charge (and/or voltage) on one or more of the batteries in the rechargeable battery bank. In some embodiments, the electronic controller may use a control signal that is indicative of a temperature in the energy storage reservoir (e.g., the temperature of one or more ultracapacitors or batteries) to control the charging (or discharging) of the ultracapacitors and/or batteries or to provide charge balancing in the ultracapacitor bank. In certain embodiments, the electronic controller may regulate the storage and/or usage of power with control signals indicative of, for example, times between generator power output, storage reservoir discharge times and discharge depths, anticipated power needs of electrical loads (current loads and/or future loads), etc. It is contemplated that the electronic controller can use a wide range of control signals indicative of various properties and characteristics of the application in which the power management system is used.

Several example embodiments of a power management system that achieve some or all of the above advantages will now be described. The example embodiments are intended to be illustrative and are not intended to limit the scope of the disclosed inventions. It will be apparent to one of ordinary skill in the electrical arts that alternate electric circuits can be used that achieve some or all of the teachings of the present disclosure.

a. Example Energy Reservoir Comprising One Ultracapacitor

Figure 6A:
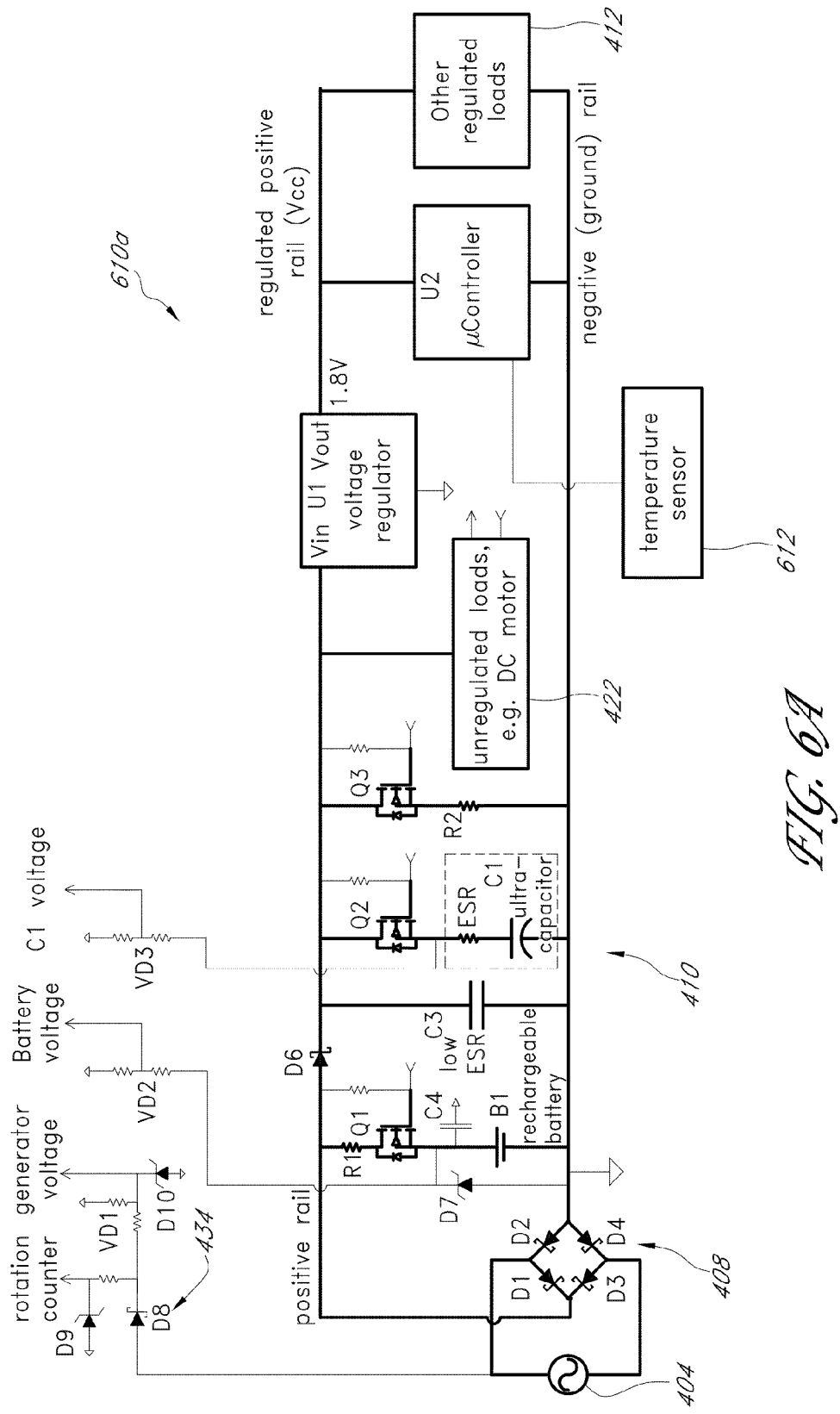
FIG. 6A is a circuit diagram schematically illustrating an embodiment of a power management system having an energy storage reservoir and an electronic controller.

FIG. 6A is a circuit diagram schematically illustrating an embodiment of a power management system configured to perform some of the functions disclosed herein. The power management system comprises an electronic controller 610a and an energy storage reservoir 410. The power management system (and preferably the controller 610a) is configured to be electrically coupled to a generator, such as the generator 404. Embodiments of the power management system can be configured to be electrically connected to any suitable generator.

Some of the components of the controller 610a are similar to components discussed with reference to FIGS. 5A and 5B and will not be further described herein except to note any differences in configuration or operation. For example, the generator 404, the rectifier 408, the rotation counter 434 may be substantially similar to the corresponding components shown in FIGS. 5A and 5B. In many applications, the generator 404 supplies a substantially sinusoidal voltage with a frequency less than about one kilohertz. In some embodiments, the generator 404 supplies a voltage to the power management system that alternates polarities (e.g., a bipolar voltage). In some applications, the bipolar voltage is approximately sinusoidal. However, in other embodiments, the generator 404 supplies to the power management system a DC voltage (e.g., produced by a generator with brushes and a commutator or by an AC generator with a rectified output). In many applications, the DC voltage produced by the generator 404 fluctuates in value due, for example, to the intermittent characteristics of the energy source. Some embodiments of the power management system may not include the rectifier 408, for example, those embodiments in which the generator 404 produces a DC voltage.

The controller 610a may include one or more temperature sensors 612 that monitor temperatures of the ultracapacitor bank and/or the rechargeable battery bank. The power management system may use one or more temperatures from the temperature sensors 612 to adjust for temperature-dependent affects found in the ultracapacitors (or in the rechargeable batteries), as described above.

The power management system shown in FIG. 6A includes an energy reservoir 410 comprising one ultracapacitor C1 and one rechargeable battery B1. The power management system advantageously may be used to provide substantially full energy in the ultracapacitor C1 for relatively long periods of time (e.g., days, months, or years). The power management system can utilize this stored energy to power, for example, the microcontroller U2, other regulated loads 412, and/or the unregulated loads 422. An additional advantage of the controller 610a is that it includes fewer components and is less expensive to fabricate than the circuit embodiments shown in FIGS. 5A and 5B.

The controller 610a comprises a microcontroller U2, which can be used to implement regulate the functions of the power management system by implementing suitable decision logic (described below). The functions may be embodied in a firmware program executed by the microcontroller. In this and the other illustrated embodiments, the controller may alternately be implemented using other types of components as mentioned above.

In the following description of functions and operations of the power management system, the terms "open" and "closed" are used to refer to states of switching transistors used in the electronic circuits shown and described.

i. Charging the Storage Reservoir from the Generator

The controller 610a can determine whether the generator 404 is producing electric power by monitoring the voltage signal produced by the voltage divider VD1 (limited by D10). If the ultracapacitor C1 is not fully charged, then the controller 610a charges the ultracapacitor C1 by closing the transistor Q2. In one preferred embodiment, the transistors Q1 and Q2 are N channel enhancement mode FETs such as, e.g., an FDN337N FET from Fairchild Semiconductor. Some embodiments of the controller 610a shown in FIG. 6A utilize the components listed in TABLE 1.

The charging voltage needed to charge the battery B1 depends on the battery chemistry and typically is somewhat higher (e.g., by a few tenths of a Volt) than the maximum working voltage of the ultracapacitor C1. Because the forward potential drop across D6 results in a somewhat higher charging voltage across the battery B1 than across the ultracapacitor C1, the controller 610a advantageously can charge the battery B1 (e.g., at a relatively low current) at the same time the ultracapacitor C1 is charged (e.g., at relatively high current). Resistor R1 limits the charging current across the battery B1, and thus advantageously allows low cost, high precision components to be used for the Zener diode D7. Also, by limiting the charging current of the battery B1 with the resistor R1, the shunt current across the Zener diode D7 can be reduced, which allows a larger fraction of the generator power to be available to charge the ultracapacitor C1 when both the battery B1 and the ultracapacitor C1 are being charged. The low pass RC filter formed by the resistor R1 and capacitor C4 advantageously provides a relatively constant charge voltage across the battery B1 during a zero crossing of the generator cycle. Preferably, the R1-C4 time constant is at least equal to a period of the rectified generator output.

When the ultracapacitor C1 is fully charged, the transistor Q2 is opened to prevent overcharging the ultracapacitor C1. The controller 610a keeps the battery B1 charged by maintaining a trickle charge voltage through Zener diode D7 whenever the generator 404 is producing a voltage above the trickle charge voltage. In embodiments using Manganese Dioxide Lithium battery chemistry for the battery B1, the trickle charge voltage is about 3.1 V. In embodiments using Lithium Vanadium Pentoxide battery chemistry for the battery B1, the trickle charge voltage is about 3.4 V.

Transistor Q3 is an optional component that can be used to allow excess power from the generator 404 to be shunted through resistor R2, at times when the generator 404 provides more power than can be dissipated by resistor R1 and the diode D7.

ii. Ultracapacitor Switch Modulation

In some cases, the peak voltage produced by the generator 404 while it is operating to provide power to an electric load may exceed the working voltage of the ultracapacitor C1, even after accounting for the voltage drop across the diode D6. In these cases, the controller 610a may modulate the transistor Q2 by closing the transistor Q2 during the fraction of the generator cycle when the generator voltage (measured at the positive terminal of the ultracapacitor C1) does not exceed the maximum working voltage of the ultracapacitor C1. In many embodiments, the microcontroller U2 can respond to changing loads and generator output sufficiently rapidly. However, in applications where the load or generator output is highly dynamic (e.g., changing at frequencies greater than about ten kHz), the transistor Q2 may be modulated by a hardware control circuit of sufficient bandwidth such as, e.g., a comparator, as is known in the art.

1. Shunt Load Modulation

In some embodiments, dynamic load or generator output can be handled by leaving the transistor Q2 closed and modulating the transistor Q3 to adjust the load applied to the generator 404 such that the voltage at the positive terminal of the ultracapacitor C1 does not exceed the working voltage of the ultracapacitor C1. For example, the modulation of the transistor Q3 may be pulse width modulation (PWM) achieved by adjusting saturation of the transistor Q3 by varying the gate voltage. In other embodiments, other power modulation methods known in the art are used. For example, a hardware control circuit modulating Q3 (e.g., a comparator as described above) may be used if the load is highly dynamic.

iii. Battery Charging

When both the battery B1 and the ultracapacitor C1 are fully charged, transistor Q1 may be closed and the transistor Q2 may be opened. The battery B1 typically is only fully charged when the generator 404 is active, because the maximum charged voltage of the battery B1 typically exceeds the maximum working voltage of the ultracapacitor C1. For example, in certain embodiments of the power system, the ultracapacitor C1 can safely be charged to about 2.5 V, while the battery B1 requires about 2.7 V for a 50% charge and about 3.0 V for a full charge.

Some of the components in the controller 610a may be selected based on factors including the chemistry of the rechargeable battery B1, the capacity of the rechargeable battery B1, the expected maximum charging voltage across the resistor R1 to ground, or a combination of the foregoing. For example, in certain embodiments the Zener voltage of the diode D7 and/or the resistance of the resistor R1 are adjusted based on these factors. For example, the low charging currents of Manganese Dioxide Lithium and Lithium Vanadium Pentoxide battery chemistries may result in the generator voltage approximating the generator's open circuit voltage (assuming no other significant load is active). TABLE 3 shows some example values for representative battery models, assuming a typical open circuit generator voltage of 5.0 V. For some generators, e.g., for generators whose rotational speed is highly variable, the open circuit voltage may at times be too high for charging current-limited battery chemistries such as Manganese Dioxide Lithium and Lithium Vanadium Pentoxide. In such applications, the controller 610a may modulate the transistor Q1 with the generator cycle in a manner similar to that described above for shunt load modulation. In some embodiments, the controller 610a utilizes the capacitor C4 to buffer the charging current during the portion of the generator cycle when the transistor Q1 is open.

TABLE 3

| Battery model | Battery chemistry | Battery capacity (mAh) | Target max charge current (mA) | D7 breakdown voltage | R1 (ohms) |
|---|---|---|---|---|---|
| ML1220 | Manganese Dioxide Lithium | 15 | 1.2 | 3.1 | 1000 |
| ML2020 | | 45 | 3.0 | 3.1 | 500 |
| VL1220 | Lithium Vanadium Pentoxide | 7 | 0.5 | 3.4 | 3000 |
| VL2020 | | 20 | 1.5 | 3.4 | 1000 |

In applications where the generator 404 is active only for relatively brief periods (e.g., the power produced is intermittent), the controller 610a may be configured to temporarily charge the ultracapacitor C1 to a voltage slightly above its normal working voltage (e.g., to about 2.7 V) in order to provide a more complete recharge of the battery B1. Although the ultracapacitor C1 may suffer a slight amount of degradation (e.g., in capacitance or ESR) in such applications due to the overcharging, the battery B1 beneficially is kept sufficiently charged.

iv. Charging the Ultracapacitor from the Battery

If the voltage (or charge) on the ultracapacitor C1 drops below a threshold voltage (or charge), some embodiments of the controller 610a advantageously can recharge the ultracapacitor C1 from the battery B1. If the generator 404 is inactive, the ultracapacitor C1 can be recharged by closing the transistors Q1 and Q2.

In some embodiments, the threshold voltage is selected to be slightly less than the maximum working voltage of the ultracapacitor C1 to reduce the number of battery recharge cycles. In such embodiments, the controller 610a will permit the ultracapacitor C1 to discharge slightly in anticipation that the generator 404 (rather than the battery B1) will provide some amount of recharge before the ultracapacitor C1 discharges further. Such embodiments may beneficially prolong battery life by avoiding unnecessary battery discharge cycles.

The threshold voltage can be specified in many ways. For example, the threshold voltage can be entered into the microcontroller U2 as a fixed value selected to be suitable for the applications likely to be encountered by the power management system. However, in other embodiments, the controller 610a may be programmed with various adaptive learning (and/or artificial intelligence) algorithms that permit the microcontroller U2 to monitor information relating to various system parameters such as, e.g., times between generator activations and the number of battery cycles and their discharge depth, and to select a suitable threshold voltage from this information.

v. Ultracapacitor Temperature Effects

The maximum working voltage and the ESR of commonly available ultracapacitors (e.g., carbon aerogel ultracapacitors) decrease with increasing temperature. In order to provide substantially constant energy output over a relatively wide range of temperature, the charge voltage on an ultracapacitor can be increased at low temperature so that the ultracapacitor provides substantially the same energy through its higher ESR at the low temperature. However, if the temperature increases, some of the charge on the ultracapacitor is removed to avoid operating the ultracapacitor above its working voltage at the higher temperature. This may be accomplished by programming the controller 610a to dump energy from the ultracapacitor C1 by closing the transistor Q3 and dissipating electrical energy in the resistor R2.

In some embodiments, the optional transistor Q3 and the optional resistor R2 are not used, and the energy may be dissipated by other loads in the power management system. For example, in one embodiment, the microprocessor U2 is operated at a higher than normal clock frequency to dissipate energy. In another embodiment, a DC motor load attached to the system is reversibly operated. A person of ordinary skill will recognize that there are many ways to dissipate energy stored in an ultracapacitor.

In some embodiments, the controller 610a monitors operating times for the generator 404. In such embodiments, the controller 610a can determine the likelihood that the power management system will be required to deliver the full amount of stored energy before another energy generation event will occur. If it is unlikely that full power will be required, the controller 610a advantageously can dissipate some energy from the ultracapacitor C1 to lower the stored energy and to improve the long-term performance of the ultracapacitor C1.

b. Example Energy Reservoir Comprising Two Ultracapacitors

Figure 6B:
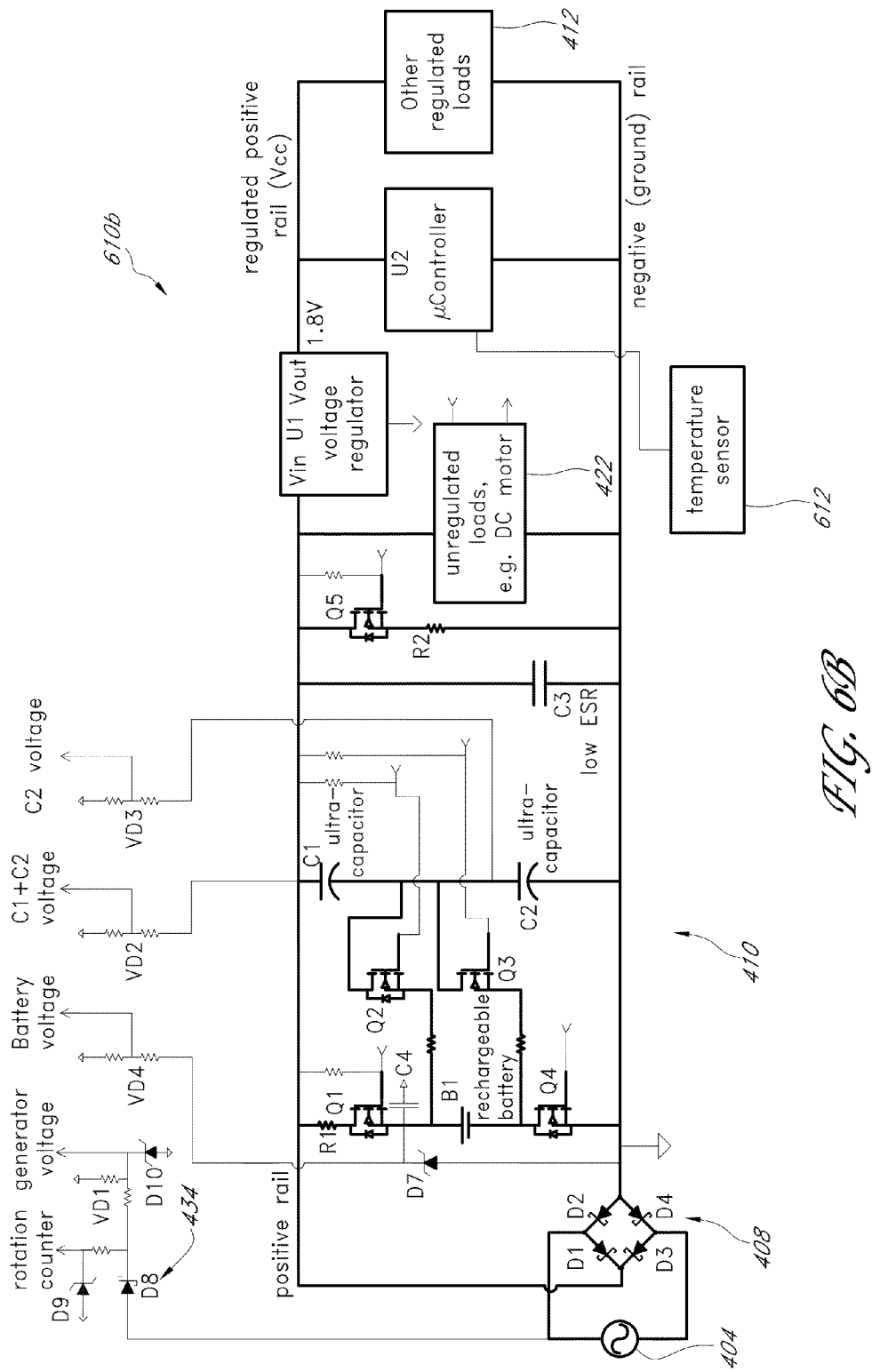
FIG. 6B is a circuit diagram schematically illustrating another embodiment of a power management system having an energy storage reservoir and an electronic controller.

FIG. 6B is a circuit diagram that schematically illustrates another embodiment of a power management system comprising an electronic controller 610b. In this embodiment, the energy storage reservoir 410 comprises two ultracapacitors C1 and C2 electrically connected in a series configuration. The energy storage reservoir 410 also comprises a rechargeable battery B1. The power management system illustrated in FIG. 6B operates in a generally similarly manner and performs substantially similar functions as the system shown in FIG. 6A, except where explicitly noted.

i. Charging the Storage Reservoir from the Generator

The generator 404 can be used to charge the ultracapacitors C1 and C2. When the generator 404 is producing power, the controller 610b keeps transistors Q2 and Q3 open. The controller 610b can determine the charge on the battery B1 by measuring the voltage across the voltage divider VD4. If the battery B1 is not fully charged, and if the series voltage across the combination C1 and C2 is greater than the voltage across the battery B1, then the controller 610b may close the transistors Q1 and Q4 in order to charge the battery B1. However, if the battery B1 is fully charged or if the series voltage across C1 and C2 is less than the voltage across the battery B1, then the transistors Q1 and Q4 may be left open by the controller 610b.

If both of the ultracapacitors C1 and C2 are fully charged, then the transistors Q1 and Q4 are closed in order to trickle charge the battery B1. The controller 610b keeps the transistors Q2 and Q3 open and modulates transistor Q5 to avoid overcharging the ultracapacitors C1 and C2. Modulation of the transistor Q5 may be performed similarly to modulation of the transistors Q2 and Q3 described with reference to FIG. 6A.

ii. Charge Balancing

As described above, an ultracapacitor bank having two or more ultracapacitors may advantageously be charge balanced to reduce the likelihood that one or more of the ultracapacitors will exceed its maximum rated voltage and to reduce variances in voltage across the ultracapacitors and variances in charging times. During operation of the generator 404, the controller 610b can charge the ultracapacitor with the lower voltage (greater capacitance) until the voltages on each ultracapacitor C1 and C2 are substantially equalized, after which charging may resume as described above. To charge the ultracapacitor C1 (and not the ultracapacitor C2), the transistors Q1 and Q2 are opened, and the transistors Q3 and Q4 are closed. To charge the ultracapacitor C2 (and not the ultracapacitor C1), the transistors Q1 and Q2 are closed, and the transistors Q3 and Q4 are opened.

iii. Ultracapacitor Switch Modulation

In some cases, the peak voltage produced by the generator 404 while it is operating to provide power to a load may exceed the working voltage across the ultracapacitor bank comprising the ultracapacitors C1 and C2, even after accounting for the voltage drop across the diode D6. In these cases, the controller 610b may protect the ultracapacitors C1 and C2 against overcharging using several methods, or a combination thereof. In a first method, shunt load modulation of the transistor Q5 as described for the transistors Q2 and Q3 with reference to FIG. 6A may be used. In a second method, the secondary shunt path formed by closing the transistors Q1, Q2, Q3, and Q4 may be modulated. Highly dynamic loads may require a hardware control circuit (e.g., a comparator) to perform the shunt load modulation as further described above.

iv. Charging the Ultracapacitor Bank from the Battery

The ultracapacitors C1 and C2 may require recharging from the battery B1 due to energy loss from loads or to replace charge lost through self-discharge. The controller 610*b* can charge the ultracapacitor C1 from the battery B1 by closing the transistors Q1 and Q3 and opening the transistors Q2 and Q4. Similarly, the controller 610*b* can charge the ultracapacitor C2 from the battery B1 by opening the transistors Q1 and Q3 and closing the transistors Q2 and Q4.

In certain preferred embodiments, the battery B1 utilizes a Manganese Dioxide Lithium battery chemistry. In certain such embodiments, an ML series battery available from Sanyo Energy (USA) Corporation (San Diego, Calif.) may be used (e.g., an ML1220 cell). Since ML batteries typically retain a voltage above 2.4 V for about 80% of their discharge curve, in these embodiments most of the capacity of the battery B1 will be available to recharge the ultracapacitors C1 and C2.

It will be apparent from FIG. 6B that when one of the ultracapacitors C1 or C2 is being charged by the battery B1, the charge to the load will be provided by the battery B1 rather than by the ultracapacitor which is being charged. If the average load current significantly exceeds the sustained source current of the battery B1 (which typically is no more than a few milliamps), then it is preferable for ultracapacitor charging to be stopped until the load current decreases.

v. Battery Charging from the Ultracapacitor Bank

The controller 610*b* can direct the ultracapacitor bank (e.g., the ultracapacitors C1 and C2 in this embodiment) to recharge the battery B1 by, for example, closing the transistors Q1 and Q4 and opening the transistors Q2 and Q3. As the battery B1 fully charges, the diode D7 will eventually begin to shunt current; accordingly, some embodiments of the controller 610*b* do not fully charge the battery B1 from the ultracapacitor bank unless decision login in the controller 610*b* estimates the generator 404 will begin to operate within a sufficiently short time interval.

As described above, some embodiments of the power management system use Manganese Dioxide Lithium battery chemistry (e.g., ML series cells). Since the ML battery charges relatively slowly, some embodiments of the controller 610*b* may begin charging the battery B1 even if the ultracapacitors C1 and C2 are not fully charged, provided that further generator output is expected before the full energy or charge storage capacity of the ultracapacitors C1 and C2 will need to be delivered to the load.

Although FIG. 6A illustrates an embodiment of the power management system in which the battery bank comprises one rechargeable battery B1, it is contemplated that other embodiments may utilize additional rechargeable batteries. A person of ordinary skill will understand that the controllers 610*a* and 610*b* can be suitably configured for a two, three, four, or more battery bank.

c. Decision Logic for the Power Management System

Embodiments of the power management system use decision logic to implement the power storage and management functions described herein. The decision logic is preferably implemented as a set of software modules comprising executable instructions performed by a processor such as, for example, the microcontroller U2 shown in FIGS. 5A-6B. In other embodiments, the decision logic can be implemented as executable instructions carried out by special or general purpose hardware (including application specific integrated circuits and/or field programmable gate arrays) or firmware.

Figure 6C:
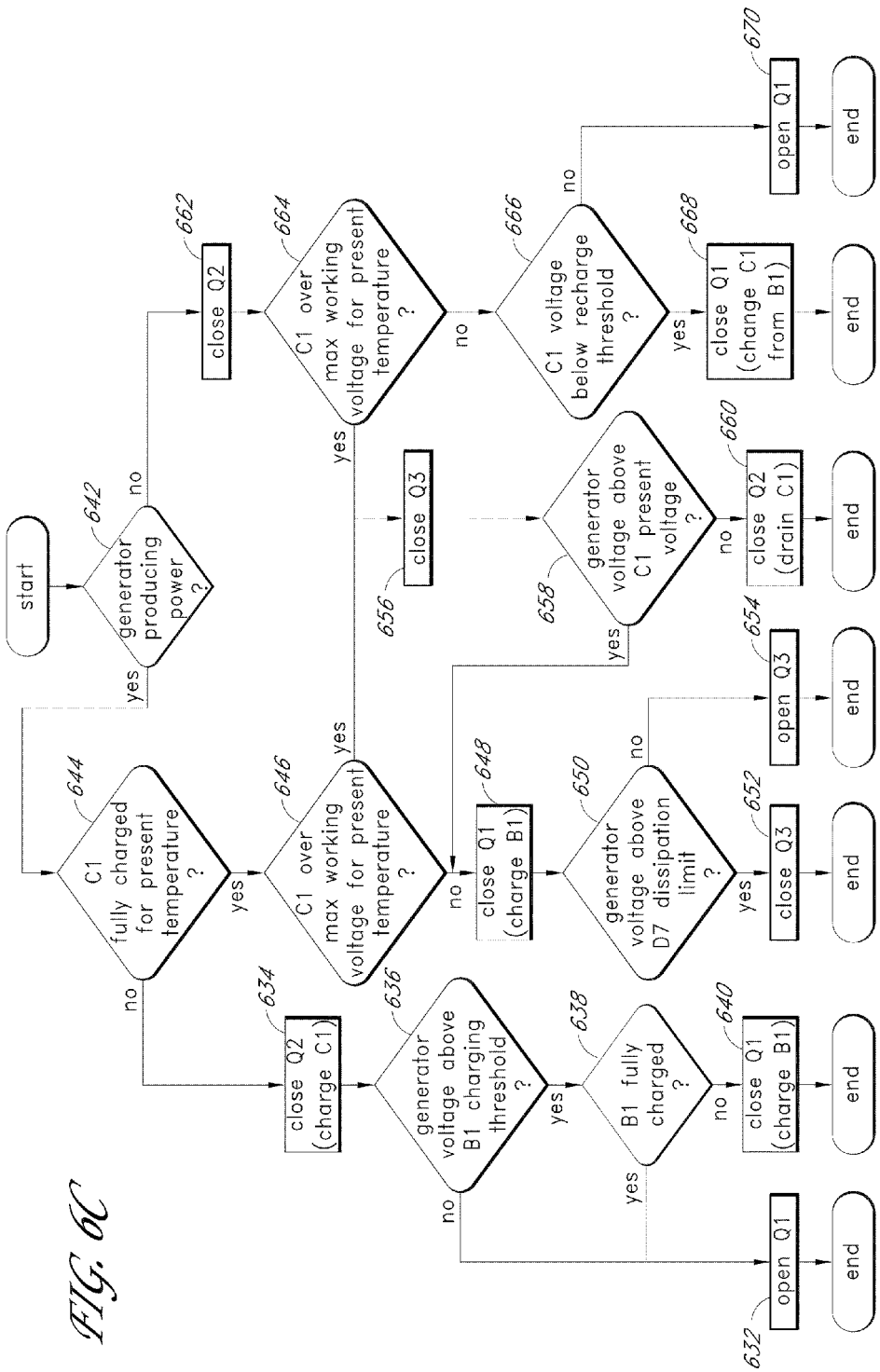
FIG. 6C is a flowchart schematically illustrating decision logic that can be used to provide various control functions in an embodiment of a power management system.

FIG. 6C is a flowchart that schematically illustrates an example of decision logic that can be used with an embodiment of the power management system that comprises an electronic controller coupled to a generator and an energy reservoir comprising one ultracapacitor C1 and one rechargeable battery B1. FIG. 6C refers to components of the power management system shown and described with reference to FIG. 6A. This example of the decision logic assumes the controller is configured to communicate with a temperature sensor that determines the temperature of the ultracapacitor C1 (e.g., the temperature sensor 612 shown in FIGS. 6A and 6B). The decision logic further assumes that the controller includes the optional transistor Q3 and optional resistor R2 (see FIG. 6A).

In block 642, the controller determines whether the generator is producing electric power (e.g., by checking the voltage on the voltage divider VD1 shown in FIG. 6A). If not, in block 662 the controller begins charging the ultracapacitor C1 from the battery B1 by closing the transistor Q2. In block 664, the controller determines whether the voltage on the ultracapacitor C1 is above its maximum working voltage. If it is, the decision logic moves to block 656, which will be described below. If the ultracapacitor C1 is not above its maximum working voltage, the controller continues to charge the ultracapacitor C1. In block 666, the controller determines whether the ultracapacitor C1 has been charged to a recharge threshold (which, as described above, may be slightly less than the working voltage). If not, the controller opens the transistor Q1 to prevent overcharging of the ultracapacitor C1. Returning to block 666, if the voltage on the ultracapacitor C1 is less than the threshold recharge voltage, the controller (in block 668) closes the transistor Q1 to permit the ultracapacitor C1 to be charged from the battery B1.

Returning to the block 642, if the generator is producing electric power, in block 644 the controller determines whether the ultracapacitor C1 is fully charged for the current operating temperature. If not, in block 634 the controller closes the transistor Q2 to charge the ultracapacitor C1. The decision logic moves to block 636 where the controller determines whether the generator is producing voltage above the charging threshold of the battery B1. If so, in block 638 the controller determines if the battery B1 is fully charged. If not, in block 640 the controller closes the transistor Q1 to continue charging the battery B1. However, if the battery is fully charged, in block 632 the controller opens the transistor Q1 to prevent overcharging of the battery B1. Returning to the block 636, if the generator is not producing voltage above the charging threshold of the battery B1, the controller also opens the transistor Q1 to prevent further charging of the battery B1.

Returning to the block 644, if the controller determines that the ultracapacitor C1 is fully charged for the present operating temperature, the decision logic moves to block 646 where the controller determines whether the voltage on the ultracapacitor C1 exceeds the maximum working voltage for the current operating temperature. If the voltage is above the maximum for the current temperature, the decision logic moves to block 656, which can also be reached from the block 664. In block 656, the controller closes the transistor Q3 and checks in block 658 whether the generator voltage exceeds the voltage across the ultracapacitor C1. If not, in block 660 the controller closes Q2 to allow excess charge in the ultracapacitor C1 to be drained through the transistor Q3 and the resistor R2. However, if in block 658 the controller determines that the generator voltage exceeds the voltage on the ultracapacitor C1, the decision logic moves to block 648 and the controller closes the transistor Q1, which permits the generator to charge the battery B1.

The controller, in block 650, determines whether the output from the generator exceeds the dissipation limit in the Zener diode D7. If the generator is producing too much power, in block 652 the controller closes the transistor Q3 so that excess generator power can also be dissipated in the resistor R2. However, it the generator is producing power below the dissipation limit of the diode D7, then in block 654 the controller opens the transistor Q3 to prevent energy dissipation in the resistor R2.

In other embodiments, the decision logic can incorporate additional or different decision blocks and can be modified to perform additional or different control functions. Other embodiments may combine some of the decision blocks shown in FIG. 6C. A skilled artisan will recognize that suitable decision logic, which may be generally similar to that shown in FIG. 6C, can be provided so that the controller can implement control functions for the power management system embodiment shown in FIG. 6B. Many variations of decision logic are possible.

d. Properties of the Power Management System

FIGS. 6A and 6B schematically illustrate two possible embodiments of the power management system. Each embodiment may be particularly suitable for certain applications and for powering certain types of loads.

The power system embodiment shown in FIG. 6A uses a single ultracapacitor, which advantageously permits simpler and cheaper electronic circuitry to be used. However, the power management system shown in FIG. 6A can supply energy only up to the maximum working voltage of the ultracapacitor C1 if damage to the system is to be avoided. The power system shown in FIG. 6B utilizes two ultracapacitors C1 and C2 in series and can provide a higher operating voltage (about equal to the sum of the working voltages of the two ultracapacitors). Since a typical maximum working voltage for an EDLC ultracapacitor is about 2.5 V, the power management system shown in FIG. 6A can provide about 2.5 V to a load, whereas the system shown in FIG. 6B can provide about 5.0 V. Higher voltages can be achieved by using additional ultracapacitors in series in the ultracapacitor bank.

The power management system embodiment shown in FIG. 6B is more efficient in its use of the energy stored in the ultracapacitors C1 and C2, as compared to use of the energy stored in the ultracapacitor C1 by the power management system embodiment shown in FIG. 6A. For example, if $V_{max}$ is the maximum operating voltage of a single ultracapacitor, and $V_{min}$ is the minimum operating voltage of the system, then for constant total capacitance $C_0$ (e.g., a single ultracapacitor of capacitance $C_0$ in FIG. 6A and two ultracapacitors in series, each of capacitance $\frac{1}{2}C_0$, producing a series capacitance of $\frac{1}{4}C_0$), the energy stored in the two systems may be determined as follows. For two ultracapacitors in series (with a total working voltage of $2V_{max}$), the stored energy is approximately $\frac{1}{2} \cdot \frac{1}{4} C_0 \cdot ((2V_{max})^2 - V_{min}^2)$, while the stored energy in a single ultracapacitor is about $\frac{1}{2} \cdot C_0 \cdot (V_{max}^2 - V_{min}^2)$. For typical values of $V_{max}$=2.5 V and $V_{min}$=2.0 V, the energy storage in the two ultracapacitor embodiment is about 170% more than the single ultracapacitor embodiment.

However, in applications where the critical load (e.g., the load that sets the required storage capacity of the ultracapacitor C1) is a current load rather than a power load, then the figure of merit may be charge storage rather than energy storage. The charge storage ratio is approximately $$\frac{1}{4} \frac{(2V_{max} - V_{min})}{(V_{max} - V_{min})}.$$

Using the typical values, $V_{max}$=2.5V and $V_{min}$=2.0V, the charge storage of the two ultracapacitor embodiment is about 50% more than the single ultracapacitor embodiment.

The power management system embodiment shown in FIG. 6A provides a relatively limited ability to recharge the battery B1 from the ultracapacitor C1, because recharge of the battery B1 is limited by the maximum working voltage of the ultracapacitor C1 plus limited over-voltage operation as described above. In contrast, the power management system embodiment shown in FIG. 6B can fully recharge the battery B1 from the ultracapacitor bank (C1 and C2 in series) whenever the decision logic implemented by the controller 610b finds it advantageous to do so.

i. Higher Load Voltages

The embodiment of the power management system shown in FIG. 6B provides approximately 50% of its total available energy at a voltage above $V_{50\%}$, where $V_{50\%}$ can be determined from $$V_{50\%}^2 - V_{min}^2 = \frac{1}{2}((2V_{max})^2 - V_{min}^2).$$

Using the typical values, $V_{max}$=2.5 V and $V_{min}$=2.0 V, the value of $V_{50\%}$ is about 3.8 V. This embodiment also provides about 50% of its total available charge at a voltage above 3.5 V for the same values If a load requires a voltage greater than the example values described above, an ultracapacitor bank comprising additional ultracapacitors in series can be used. For example, the ultracapacitor bank can include three, four, five, six, or more ultracapacitors in series. Additionally, embodiments of the controller usable with such ultracapacitor banks will generally utilize additional switching transistors to provide control function such as, e.g., battery charging and charge balancing.

ii. Constant Load Voltages

As described above, the power management system embodiment of FIG. 6B provides most of its energy at a relatively high voltage. In an application where most of the load (as measured by charge delivered) is at a relatively low, substantially constant voltage powered through the voltage regulator U1, it may be advantageous to provide charge from only one of the ultracapacitors in the bank.

Figure 6D:
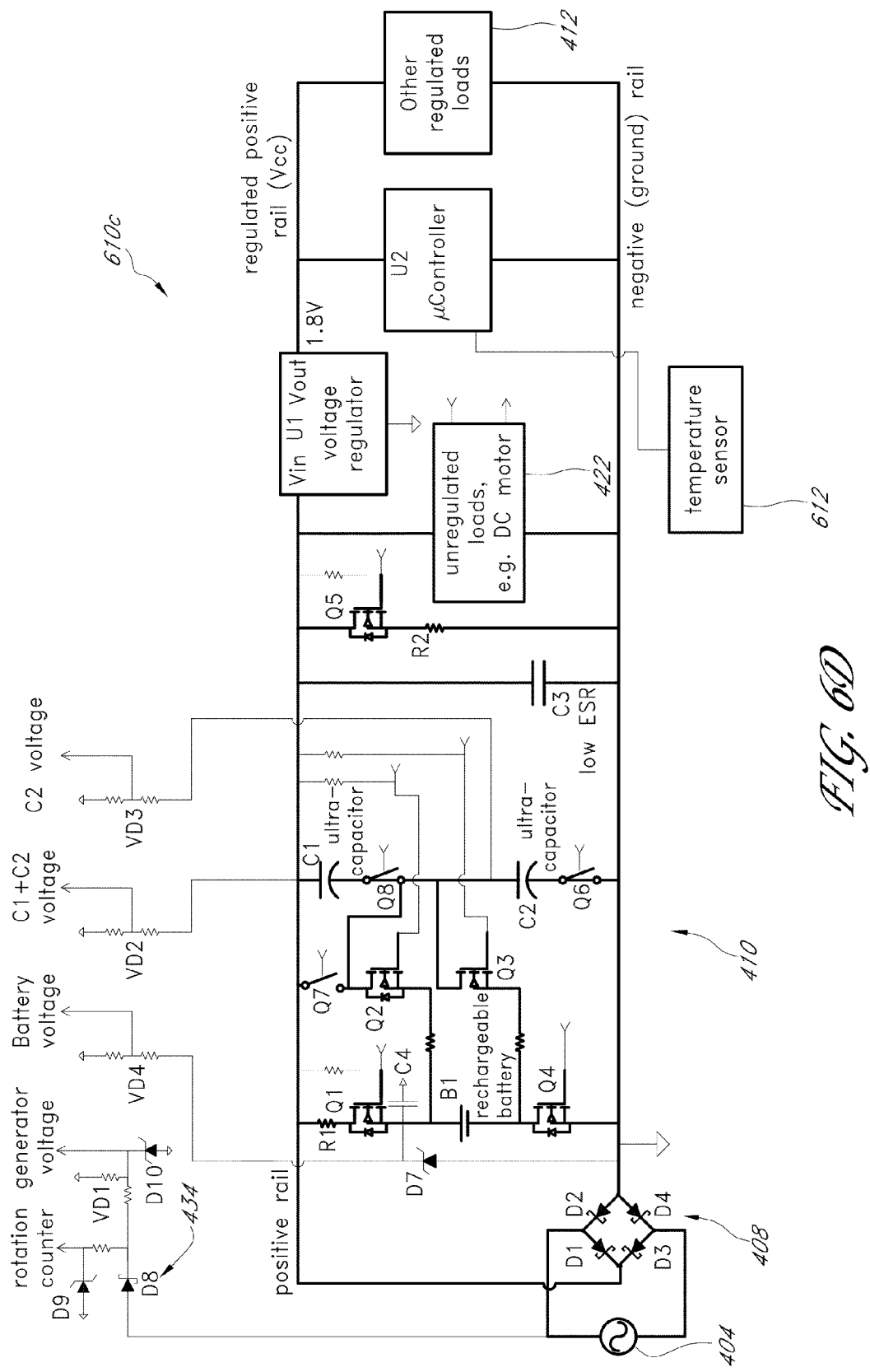
FIG. 6D is a circuit diagram schematically illustrating another embodiment of a power management system having an energy storage reservoir and an electronic controller.

FIG. 6D is a circuit diagram for another embodiment of a power management system that permits loads to be fed from only one ultracapacitor at a time. The embodiment shown in FIG. 6D is generally similar to the embodiment described with reference to FIG. 6B and only differences will be described herein where appropriate. This embodiment of the power management system comprises an electronic controller 610c and a energy storage reservoir 410 that comprises an ultracapacitor bank with two ultracapacitors C1 and C2 in series. As shown in FIG. 6D, the controller 610c comprises additional transistors Q6, Q7 and Q8, which for simplicity are shown in FIG. 6D as switches without gate drive pullups. The controller 610c advantageously permits loads to be fed from only one ultracapacitor at a time (or in alternation), until each ultracapacitor is discharged to the minimum operating voltage $V_{min}$, whereafter the two ultracapacitors C1 and C2 may be connected in series to further power the load substantially as described above.

In this embodiment, to drive the load only from the ultracapacitor C1, the controller 610c closes the transistors Q3, Q4, and Q8, and opens the transistors Q6 and Q7. The transistors Q1, Q2, and Q5 are kept open regardless of which ultracapacitor is driving the load. To drive the load only from the ultracapacitor C2, the controller 610c opens the transistors Q3, Q4, and Q8, and closes the transistors Q6 and Q7. To drive the load from the ultracapacitors C1 and C2 in series, because, for example, the two ultracapacitors have discharged to about $V_{min}$ or a load needs or is more efficient with a higher voltage, the controller 610c may close the transistors Q6 and Q8 and open the transistors Q3, Q4, and Q7.

In a case where substantially the entire load is delivered at a substantially constant voltage of about $V_{min}$, an embodiment (such as that in FIG. 6B) with total capacitance $C_0$, (e.g., two ultracapacitors in series, each of capacitance $\frac{1}{2}C_0$, producing a series capacitance of $\frac{1}{4}C_0$) delivers a total charge of about $$\frac{1}{4}C_0(2V_{max} - V_{min}).$$

However, an embodiment that alternates use of the two ultracapacitors C1 and C2 individually until each reaches the minimum operating voltage $V_{min}$, and then connects them in series, delivers a total charge of $$2 \cdot \frac{1}{2}C_0(V_{max} - V_{min}) + \frac{1}{4}C_0(2V_{min} - V_{min}),$$

which can be simplified to $$C_0\left(V_{max} - \frac{3}{4}V_{min}\right).$$

For typical values of $V_{max}$=2.5 V and $V_{min}$=2.0 V, the latter embodiment advantageously delivers 33% more total charge to the load.

Although the invention(s) have been described in terms of certain preferred embodiments and certain preferred uses, other embodiments and other uses that are apparent to those of ordinary skill in the art, including embodiments and uses which do not provide all of the features and advantages set forth herein, are also within the scope of the invention(s). For example, in any method or process described herein, the acts or operations of the method/process are not necessarily limited to any particular disclosed sequence. Also, for purposes of contrasting different embodiments or the prior art, certain aspects and advantages of these embodiments are described herein where appropriate. It should be understood that not necessarily all such aspects and advantages need be achieved in any one embodiment. Thus, it should be recognized that certain embodiments may be carried out in a manner that achieves or optimizes one advantage or group of advantages without necessarily achieving other aspects or advantages that may be taught or suggested herein. Accordingly, the scope of the invention(s) is defined by the claims that follow and their obvious modifications and equivalents.

What is claimed is:

1. A system for managing electrical power generated by an electric generator disposed on a human-propelled wheeled cart, the electric generator configured to generate electrical power from rotational motion of a wheel of the human-propelled wheeled cart, the system comprising:
   an energy storage unit configured to be electrically coupled to the electric generator disposed in or on the human-powered wheeled cart, the energy storage unit comprising a capacitive storage unit and a rechargeable battery storage unit; and
   electronic circuitry configured to be electrically coupled to the energy storage unit and the electric generator, the electronic circuitry configured to provide electrical power to electrical loads disposed in or on the cart from electric power generated by the electric generator, electric power stored by the energy storage unit, or electric power from both the electric generator and the energy storage unit, the electronic circuitry further configured to provide buffered power to the electrical loads on a first timescale and on a second timescale, the second timescale different from the first timescale,
   wherein the first timescale corresponds to a discharge rate of the capacitive storage unit due to internal resistance and the second timescale corresponds to a recharge rate at which the battery storage unit can recharge the capacitive storage unit.

2. The system of claim 1, wherein the system is configured to receive a bipolar voltage from the electric generator.

3. The system of claim 1, wherein the system is configured to receive a fluctuating direct current voltage from the electric generator.

4. The system of claim 1, wherein the capacitive storage unit comprises one or more ultracapacitors.

5. The system of claim 1, wherein the capacitive storage unit comprises two or more ultracapacitors.

6. The system of claim 5, wherein the electronic circuitry is configured to provide power to the electric loads from a first ultracapacitor selected from the two or more ultracapacitors.

7. The system of claim 6, wherein the electronic circuitry is configured to provide power to the electric loads from a second ultracapacitor selected from the two or more ultracapacitors, the second ultracapacitor different from the first ultracapacitor.

8. The system of claim 7, wherein the electronic circuitry is configured to provide power to the electric loads from the first ultracapacitor and the second ultracapacitor in alternation.

9. The system of claim 5, wherein the electronic circuitry is configured to charge balance at least two of the two or more ultracapacitors.

10. The system of claim 1, wherein the rechargeable battery storage unit comprises one or more rechargeable batteries.

11. The system of claim 1, wherein the electronic circuitry is configured to provide power at a first voltage and at a second voltage, the second voltage different from the first voltage.

12. The system of claim 11, wherein the first voltage comprises a regulated voltage.

13. The system of claim 1, further comprising a temperature sensor, wherein the electronic circuitry is further configured to use a temperature from the temperature sensor to adjust for temperature dependence of the energy storage unit.

14. The system of claim 1, wherein the electronic circuitry is capable of selecting between charging the capacitive storage unit with energy from the electric generator or with energy from the battery storage unit.

15. The system of claim 1, wherein the electronic circuitry is capable of selecting between charging the battery storage unit with energy from the electric generator or with energy from the capacitive storage unit.

16. The system of claim 1, wherein the electronic circuitry is further configured to modulate voltage to the capacitive storage unit such that the modulated voltage does not exceed a maximum working voltage of the capacitive storage unit.

17. The system of claim 16, wherein the electronic circuitry further comprises a comparator configured to modulate dynamic loads.

18. The system of claim 16, wherein the electronic circuitry is configured to modulate an electrical load applied to the electric generator such that the modulated voltage to the capacitive storage unit does not exceed the maximum working voltage.

19. The system of claim 1, wherein the system is configured to provide a first sustained power over the first timescale and a second sustained power over the second timescale, the first timescale less than the second timescale, and the first sustained power greater than the second sustained power.

20. The system of claim 19, wherein the first timescale is less than about one second, the second timescale is greater than about 10 hours, the first sustained power is greater than about 10 Watts, and the second sustained power is about several milliWatts.

21. The system of claim 19, wherein the electronic circuitry is configured to provide the first power to an unregulated load and the second power to a regulated load.

22. The system of claim 1, in combination with the electric generator.

23. The system of claim 22, wherein the system and the electric generator are configured to be disposed inside the wheel of the cart.

24. The system of claim 23, wherein the cart is a shopping cart.

25. A method for controlling power generated by an electric generator disposed in or on a human-propelled wheeled cart, the method comprising:
- generating electric power with an electric generator disposed in or on a human-propelled wheeled cart, the electric power generated from rotational movement of at least one wheel of the cart;
- storing at least a portion of the generated electric power in an energy storage unit comprising a capacitive storage unit and a rechargeable battery storage unit;
- supplying first electric power from the energy storage unit to a first electrical load in or on the cart over a first time period, the first time period corresponding to a discharge rate of the capacitive storage unit due to internal resistance; and
- supplying second electric power from the energy storage unit to a second electrical load in or on the cart over a second time period, the second time period corresponding to a recharge rate at which the battery storage unit can recharge the capacitive storage unit, the second time period longer than the first time period and the second electric power less than the first electric power,
- wherein storing at least a portion of the generated electric power comprises:
  - charging the capacitive storage unit from the electric generator when the capacitive storage unit is not fully charged; and
  - charging the rechargeable battery storage unit from the electric generator when the capacitive storage unit is fully charged.

26. The method of claim 25, further comprising charging the rechargeable battery storage unit from the electric generator when the capacitive storage unit is not fully charged and voltage generated by the electric generator is above a charging threshold of the rechargeable battery storage unit.

27. The method of claim 25, further comprising charging the capacitive storage unit from the rechargeable battery storage unit when the electric generator is not generating electric power.

28. The method of claim 25, further comprising:
- determining an operating temperature of the capacitive storage unit; and
- determining whether the capacitive storage unit is fully charged based at least in part on the operating temperature.

29. The method of claim 25, wherein the capacitive storage unit comprises two or more ultracapacitors, and the method further comprises charge balancing at least two of the two or more ultracapacitors.

30. The method of claim 25, wherein charging the capacitive storage unit from the electric generator comprises providing a charging voltage to the capacitive storage unit that does not exceed a maximum working voltage of the capacitive storage unit, when the voltage generated by the electric generator is above the maximum working voltage.

31. The method of claim 30, comprising adjusting an electrical load applied to the electric generator such that the charging voltage is less than the maximum operating voltage.

32. The method of claim 25, wherein the first electric load comprises an unregulated load and the second electric load comprises a regulated load.

33. The method of claim 32, wherein the first electric load comprises a brake mechanism for a wheel of the cart, and the second electric load comprises a radio frequency receiver.

* * * * *